(12) United States Patent
Curns et al.

(10) Patent No.: US 6,901,407 B2
(45) Date of Patent: May 31, 2005

(54) SYSTEM AND METHOD FOR UPDATING PROJECT MANAGEMENT SCHEDULING CHARTS

(76) Inventors: Rick D. Curns, 1201 Chelsey La., Huntsville, AL (US) 35803; Russell Borman, 204 Zephyr Cir., Huntsville, AL (US) 35801

( * ) Notice: Subject to any disclaimer, the term of this patent is extended or adjusted under 35 U.S.C. 154(b) by 0 days.

(21) Appl. No.: 09/917,187

(22) Filed: Jul. 27, 2001

(65) Prior Publication Data
US 2003/0066030 A1 Apr. 3, 2003

Related U.S. Application Data

(60) Provisional application No. 60/261,369, filed on Jan. 12, 2001, and provisional application No. 60/261,907, filed on Jan. 16, 2001.

(51) Int. Cl.[7] .............................................. G06F 17/30
(52) U.S. Cl. ........................ 707/102; 707/204; 717/101; 717/120; 715/506
(58) Field of Search ................................ 707/102, 204; 717/101, 120; 715/506

(56) References Cited

U.S. PATENT DOCUMENTS

| | | | | |
|---|---|---|---|---|
| 4,019,027 A | * | 4/1977 | Kelley | 235/89 R |
| 4,937,743 A | * | 6/1990 | Rassman et al. | 705/8 |
| 5,016,170 A | * | 5/1991 | Pollalis et al. | 705/7 |
| 5,414,843 A | * | 5/1995 | Nakamura et al. | 707/104.1 |
| 5,497,373 A | | 3/1996 | Hulen et al. | |
| 5,528,263 A | | 6/1996 | Platzker et al. | |
| 5,561,811 A | | 10/1996 | Bier | |
| 5,563,994 A | * | 10/1996 | Harmon et al. | 345/440 |
| 5,568,963 A | | 10/1996 | Bennett et al. | |
| 5,608,651 A | | 3/1997 | Leavy et al. | |
| 5,715,021 A | | 2/1998 | Gibeau et al. | |
| 5,717,879 A | | 2/1998 | Moran et al. | |
| 6,067,548 A | * | 5/2000 | Cheng | 707/103 R |
| 6,588,004 B1 | * | 7/2003 | Southgate et al. | 716/11 |

FOREIGN PATENT DOCUMENTS

JP 406004541 A * 1/1994 ........... G06F/15/21

OTHER PUBLICATIONS

Townsend et al., Microsoft Office 6 in 1, pp. 333–346, 1994.*

* cited by examiner

Primary Examiner—John E. Breene
Assistant Examiner—Khanh Pham
(74) Attorney, Agent, or Firm—Waddey & Patterson, PC; Mark J. Patterson; Larry W. Brantley

(57) ABSTRACT

A computer system for updating graphic-oriented project management scheduling charts (GOPMSCs) includes an Update Module for linking chart data elements in the GOPMSCs to multiple data elements in one or more data sources, selecting one of the multiple data elements for each chart data element for use in generating updated versions of the GOPMSCs, and generating updated versions of the GOPMSCs using the selected data elements. The chart data elements are linked to the multiple data elements using maps containing information linking the chart data elements to the multiple data elements and information identifying one of the multiple data elements to be used when generating updated versions of the GOPMSCs. The computer system generates updated versions of the GOPMSCs by reading the maps, selecting one of the multiple data elements linked to each chart data element, and generating updated versions of the GOPMSCs using the selected data elements.

20 Claims, 28 Drawing Sheets

Selective Comparison Chart

SYSTEM AND METHOD FOR UPDATING PROJECT MANAGEMENT SCHEDULING CHARTS

Be it known that we, Ricky D. Curns, a citizen of the United States, residing at 1201 Chesley Lane, Huntsville, Ala. 35803, and Russell Borman, a citizen of the United States, residing at 204 Zephyr Circle, Huntsville, Ala. 35081, have invented a new and useful "System and Method for Updating Project Management Scheduling Charts."

This application claims benefit of co-pending U.S. Provisional Patent Application Ser. No. 60/261,369, filed Jan. 12, 2001 and entitled "Scheduling Software," and U.S. Provisional Patent Application Ser. No. 60/261,907, filed Jan. 16, 2001 and entitled "Scheduling Software."

BACKGROUND OF THE INVENTION

The present invention relates generally to systems and methods for producing project management scheduling charts. More particularly, this invention pertains to a system and method for generating and updating project management scheduling charts (PMSCs).

Project management scheduling tools for generating PMSCs are known in the art and can be generally classified into two types: Critical Path Method tools and Graphic Portrayal tools. Critical Path Method tools are primarily data-oriented tools used for planning work projects and include software programs, such as Microsoft Project, Open Plan, and Primavera. An example of a data-oriented project management scheduling chart (DOPMSC) generated by a Microsoft Project software program is shown in FIG. 1. Graphic Portrayal tools, on the other hand, are primarily graphic-oriented tools used for graphically displaying work projects and include software programs such as Microsoft PowerPoint, CorelDraw, Microsoft Excel, and Milestones Professional. An example of a graphic-oriented project management scheduling chart (GOPMSC) generated using a Milestones Professional software program is shown in FIG. 2.

Critical Path Method tools are necessary to generate Integrated Master Schedule Charts for work projects. Integrated Master Schedule Charts are DOPMSCs and are used for a variety of purposes including creating a logical model of a project, ensuring that a project will be completed by a certain time, applying resources to various tasks, tracking hand-offs between work groups, comparing work progress with work scheduled, monitoring critical paths, creating and implementing workarounds, and understanding the effect of schedule movement. Integrated Master Schedule Charts are known in the art and an example of an Integrated Master Schedule Chart generated by Microsoft Project is shown in FIG. 3. While Critical Path Method tools are useful in generating Integrated Master Schedule Charts, these tools are not as useful when communicating the information contained in an Integrated Master Schedule Chart to management personnel.

First, if the Integrated Master Schedule Chart is printed out, it usually includes multiple pages and can be difficult to understand. If the information contained in the Integrated Master Schedule Chart is used to generate a Program Evaluation and Review Technique (PERT) chart, which can be used to communicate the information contained in an Integrated Master Schedule, the resulting PERT chart is large and bulky. In addition, summary rollups provided by Critical Path Method tools are typically too generic and the graphics overviews provided by Critical Path Method tools are not customizable. Finally, it is difficult to communicate "What If" scenarios and changes to management and customers, as well as to integrate other information, such as pictures and graphics, using Critical Path Method tools. In short, it is difficult to portray a desired message using Critical Path Method tools.

To overcome some of the problems associated with Critical Path Method tools, the information contained in an Integrated Master Schedule Chart is transferred to a Graphics Portrayal tool, which can be used to generate GOPMSCs. A typical GOPMSC generated by a Milestones Professional software program is shown in FIG. 2. Graphing the information contained in an Integrated Master Schedule using a Graphics Portrayal tool, however, is also problematic.

Because there is no information link between a Critical Path Method tool and a Graphic Portrayal tool, information must be manually transferred from the Critical Path Method tool to the Graphic Portrayal tool in order to generate the GOPMSC using the Graphic Portrayal tool. Second, if the information contained in the Critical Path Method tool changes, the information contained in both the Critical Path Method tool and the Graphic Portrayal tool must be manually updated. This process usually involves updating the information contained in the Critical Path Method tool, updating the data in the Graphics Portrayal tool, generating revised GOPMSCs using the Graphics Portrayal tool, checking the revised GOPMSCs for errors that typically occur when the information is manually transferred from the Critical Path Method tool to the Graphics Portrayal tool, and correcting any errors as necessary. This process is very time consuming. In fact, approximately 40% of program analyst time is spent updating GOPMSCs instead of solving scheduling problems. As a result of the time consuming nature of updating GOPMSCs, in many cases only near term items in these charts are updated. In some cases, when the program analyst does not have enough time to update all of the charts, many charts are actually dropped.

In addition to being time consuming, manually updating GOPMSCs is also very expensive. The average work project requires the updating of twelve (12) charts per month, or one hundred forty-four (144) charts per year. With an average manual update time per chart of six (6) hours, it takes eight hundred sixty-four (864) hours per year to manually update charts. At an average cost of $40 per hour, it costs $34,560 per year to update GOPMSCs.

Two of the prior art software programs mentioned previously, Microsoft Project and Milestones Professional, do provide features that are useful in updating DOPMSCs and GOPMSCs. Microsoft Project 2000, published by Microsoft Corporation, One Microsoft Way, Redmond, Wash. 98052-6399, is a software program designed to generate DOPMSCs using a conventional personal computer (PC) having a Pentium 75 MHz or higher processor, 30–204 MB of available hard-disk space, 24–40 MB of RAM, VGA or higher resolution monitor (Super VGA recommended), Microsoft Windows 95, Windows 98, or Windows 2000 operating system, CD-ROM drive, and a Microsoft Mouse, Microsoft IntelliMouse, or compatible pointing device. This software program allows a user to link information in one DOPMSC to information in another DOPMSC or to information in another software program, such as Microsoft Excel. As a result, when two charts are linked together, changing the information in one of the linked charts changes the information in both charts, thereby reducing the amount of time required to update the DOPMSC. In a similar manner, when a chart is linked to information in another software program, changing the information in the software program changes the information in the chart and changing the information in the chart changes the information in the software program. While the information link provided by Microsoft Project does reduce the amount of time required to update DOPMSCs, it does not reduce the amount of time required to update GOPMSCs.

Milestones Professional 2000, published by KIDASA Software, Inc., 1114 Lost Creek Boulevard, Suite 300, Austin, Tex. 78746, is designed to generate GOPMSCs and to run on a conventional personal computer having 28 MB of disc space and a Windows 95, 98, NT, or 2000 operating system. This software program allows a user to link information from one GOPMSC to information contained in another GOPMSC. Accordingly, when the information is updated in one chart, the data is updated in both charts.

The information link provided by Milestones Professional, however, has several disadvantages. First, the link does not allow a user to link a chart data element, i.e., a symbol associated with a Start Date, Finish Date, etc., in a GOPMSC to multiple source data elements in one or more DOPMSCs. In addition, the link does not allow a user to select one of the linked source data elements to be used when generating an updated version of the GOPMSC, a comparison GOPMSC, or a "What If" GOPMSC.

What is needed, then, is a less time-consuming and less expensive system and method for generating and updating GOPMSCs.

SUMMARY OF THE INVENTION

Accordingly, one object of the present invention is to provide a system and method for linking information contained in GOPMSCs to information contained in DOPMSCs or other GOPMSCs.

Another object is to provide a system and method for linking chart data elements in a GOPMSC to multiple source data elements in a DOPMSC or another GOPMSC.

A further object of the present invention is to provide a system and method for linking chart data elements in a GOPMSC to multiple source data elements in multiple DOPMSCs or other GOPMSCs.

Another object of the present invention is to provide a system and method for selecting one of the multiple source data elements linked to a chart data element to be used when generating an updated version of the GOPMSC, a comparison GOPMSC, or a "What-If" GOPMSC.

Still another object is to provide a system and method for automatically updating GOPMSCs linked to multiple DOPMSCs or other GOPMSCs by updating the data in the linked charts and generating updated GOPMSCs by clicking a mouse button.

Yet another object is to provide a system and method for automatically updating GOPMSCs linked to multiple DOPMSCs or other GOPMSCs by linking the data in the GOPMSC to data contained in multiple new DOPMSCs or GOPMSCs and generating updated GOPMSCs using the data from the new charts by clicking a mouse button.

To satisfy these and other objects, the present invention includes a computer system for generating GOPMSCs containing a plurality of chart data elements, linking the plurality of chart data elements to multiple source data elements in one or more DOPMSCs or GOPMSCs, selecting one of the multiple source data elements for use in generating an updated version of the GOPMSC, and generating updated versions of the GOPMSC. The computer system includes a Graphics Portrayal tool for generating GOPMSCs, a Critical Path Method tool for generating DOPMSCs, and a database for storing information linking chart data elements in GOPMSCs to multiple source data elements in one or more DOPMSCs or GOPMSCs and information identifying one of the multiple source data elements to be used when generating an updated versions of the GOPMSCs.

The computer system also includes a novel software program for use in linking chart data elements in GOPMSCs to multiple source data elements in one or more DOPMSCs or GOPMSCs, for selecting one of the linked source data elements for each chart data element for use in generating updated versions of GOPMSCs, and for generating updated versions of GOPMSCs. The software program is used to create maps linking chart data elements to multiple source data elements in one or more DOPMSCs or GOPMSCs and identifying one of the linked source data elements for use in generating updated versions of GOPMSCs. The maps are created by importing chart data elements into the database, assigning chart identification numbers (CIDs) to each chart data element, inputting information identifying one of the multiple linked source data elements to be used when generating updated versions of GOPMSCs, and inputting information linking each CID to multiple unique identification numbers (UID), each UID associated with a source data element in the one or more DOPMSCs or GOPMSCs. The software program selects one of the linked source data elements for each chart data element for use in generating updated versions of GOPMSCs by reading the information identifying one of the multiple linked source data elements for use in generating updated versions of GOPMSCs. Finally, the software program generates updated versions of GOPMSCs by reading the maps, retrieving one of the source data elements linked to each chart data element, and generating updated versions of the GOPMSC using the retrieved source data elements.

In one embodiment, the software program is written in Visual Basic and runs on a personal computer using a Pentium 233 MHz, a Windows 98 operating system, and 64 MB RAM. This embodiment also includes Milestones Professional 2000, which is a Graphics Portrayal tool that is used to generate GOPMSCs, Microsoft Access 97, which is a database software program that is used to create a database for receiving and storing the information linking chart data elements from GOPMSCs to multiple source data elements in one or more DOPMSCs or GOPMSCs, and Microsoft Project, which is a Critical Path Method tool that is used to generate DOPMSCs.

BRIEF DESCRIPTION OF THE DRAWINGS

Figure 2:
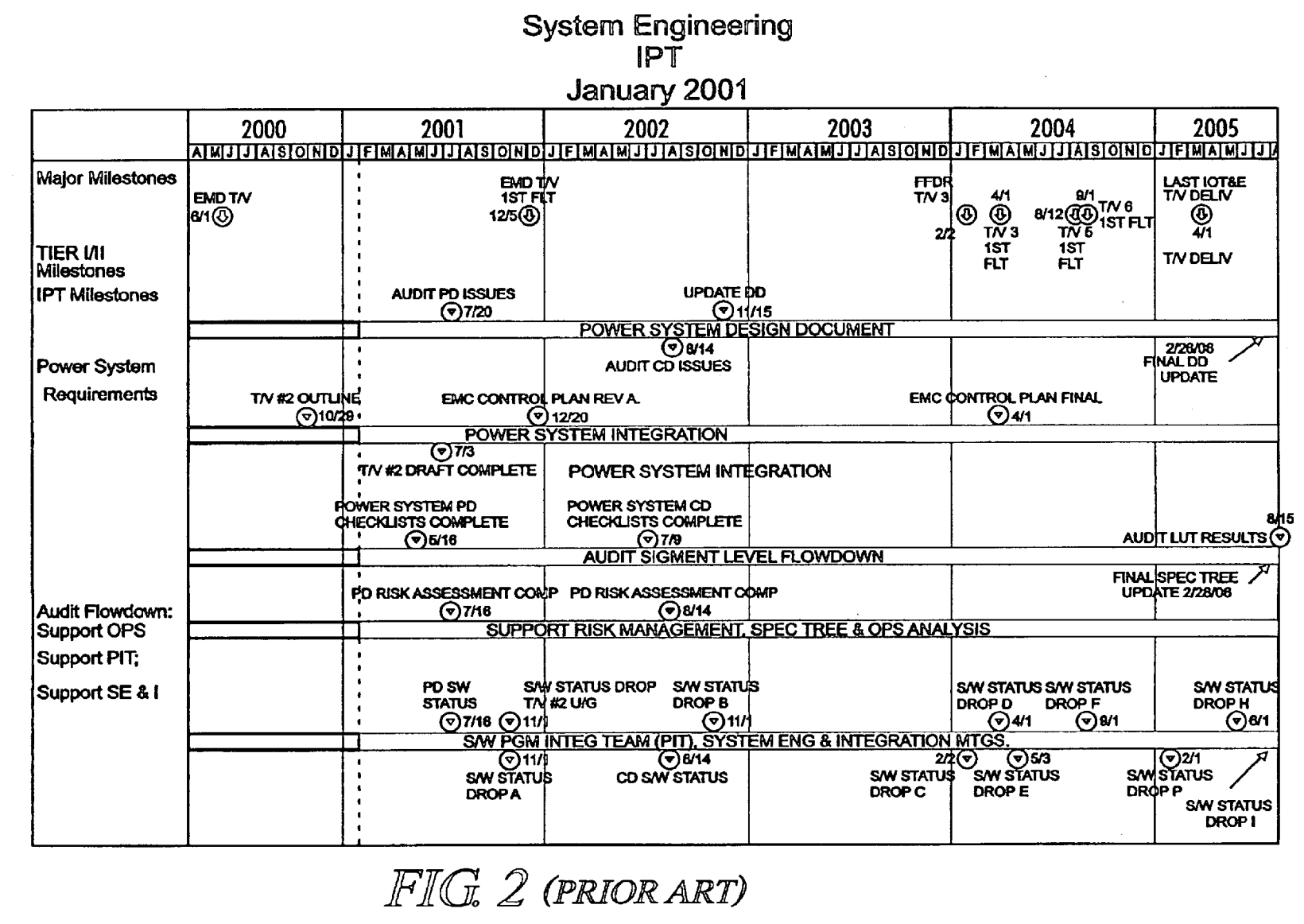

FIG. 2 is an example of a graphic-oriented project management scheduling chart (GOPMSC) generated by a Milestones Professional software program.

Figure 34:
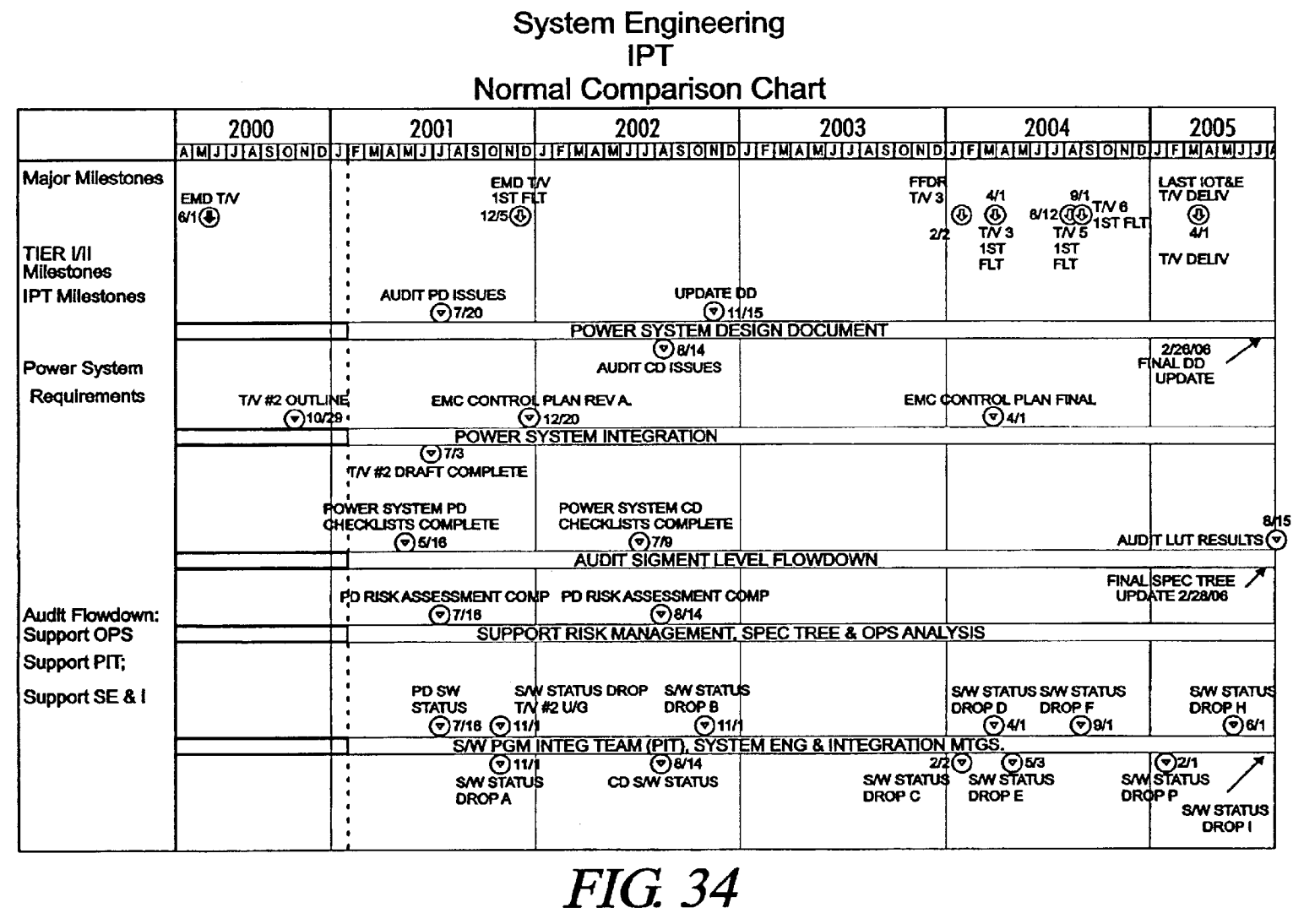

FIG. 34 is Normal GOPMSC generated by the computer system of the present invention.

Figure 35:
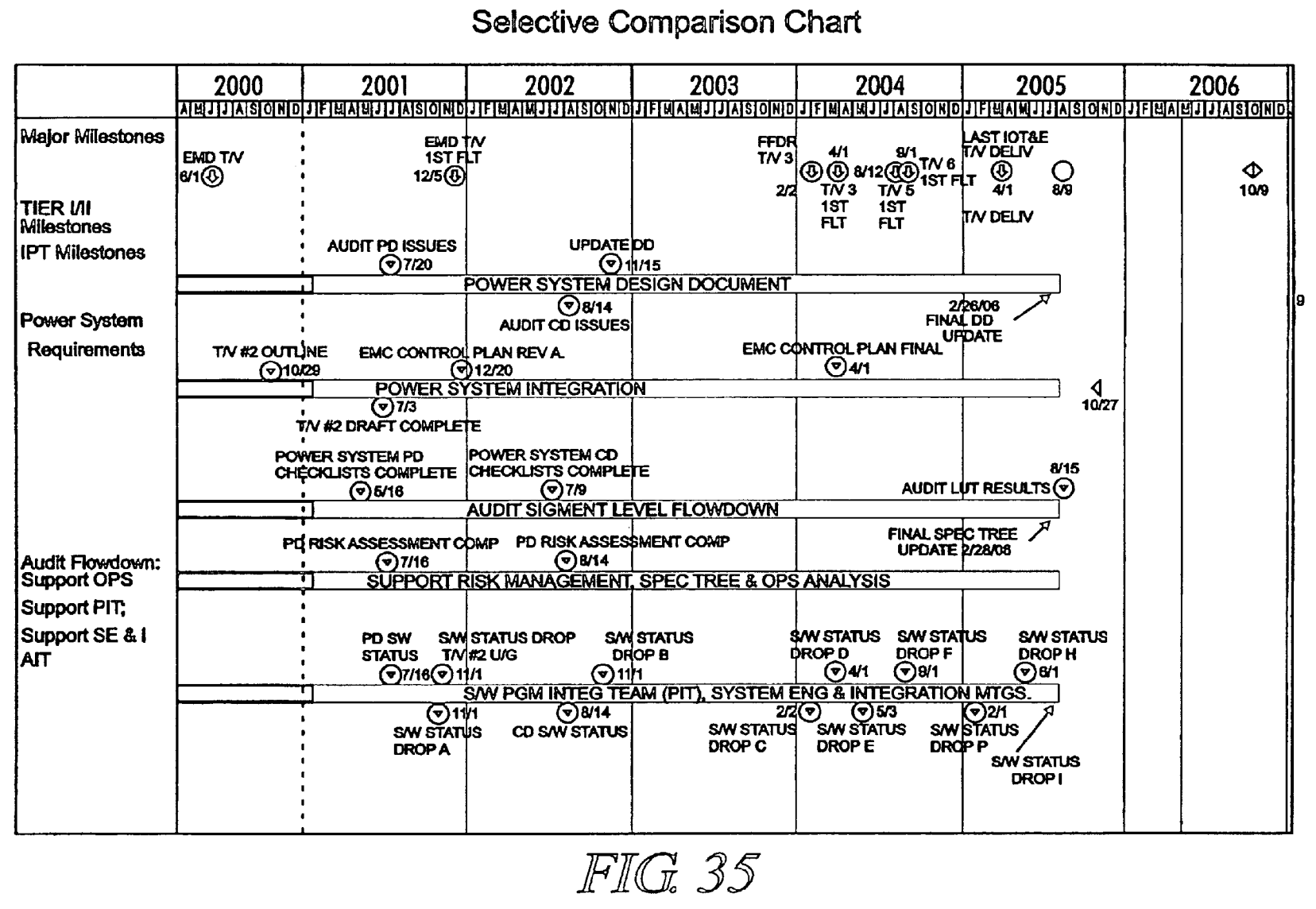

FIG. 35 is a Comparison Selective GOPMSC generated by the computer system of the present invention.

DETAILED DESCRIPTION OF THE INVENTION

As mentioned previously, one embodiment of the system of the present invention includes the Milestones Professional software program for generating graphic-oriented project management scheduling charts (GOPMSCs) ("GOPMSC Module"), Microsoft Project software program for generating data-oriented project management scheduling charts (DOPMSC) ("DOPMSC Module"), Microsoft Access software program for creating a database for storing information linking chart data elements in the GOPMSCs to multiple source data elements in the DOPMSCs and identifying one of the linked source data elements for use in generating updated versions of the GOPMSCs ("Database Module"), and a novel software program for creating the information linking chart data elements in the GOPMSCs to multiple source data elements in the DOPMSCs, selecting one of the linked source data elements for use in generating updated versions of GOPMSCs, and generating updated versions of GOPMSCs ("Update Module"). Those skilled in the art will recognize, however, that the computer system of the present invention may be implemented in a variety of ways using various types of software programs and operating systems. For example, the Update Module may be written in a number of different programming languages and run on a number of different operating systems. In addition, chart data elements may be linked to source data elements in data files generated by many different types of software programs.

Figure 1:
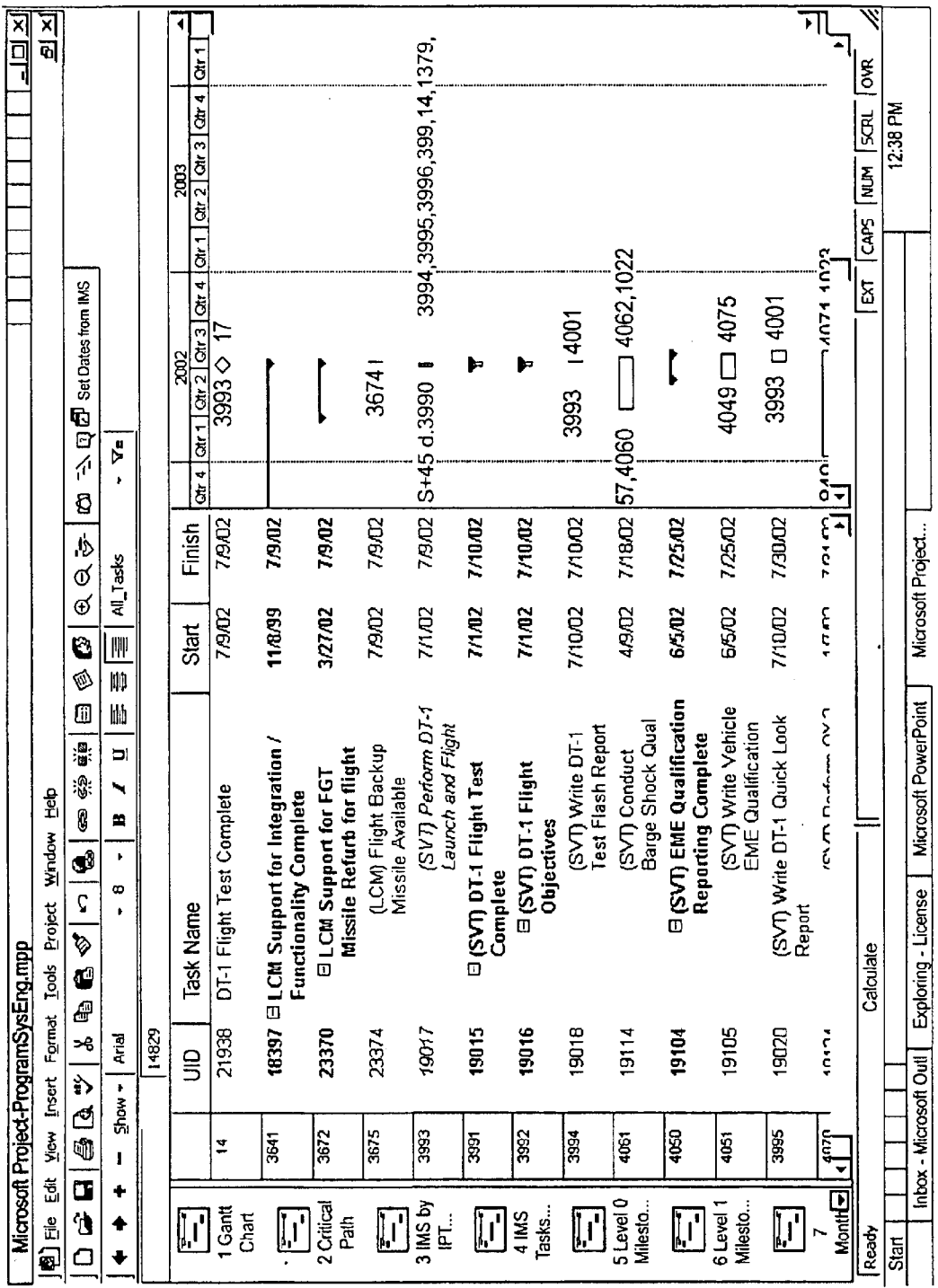
FIG. 1 is an example of a data-oriented project management scheduling chart (DOPMSC) generated by a Microsoft Project software program.
Figure 3:
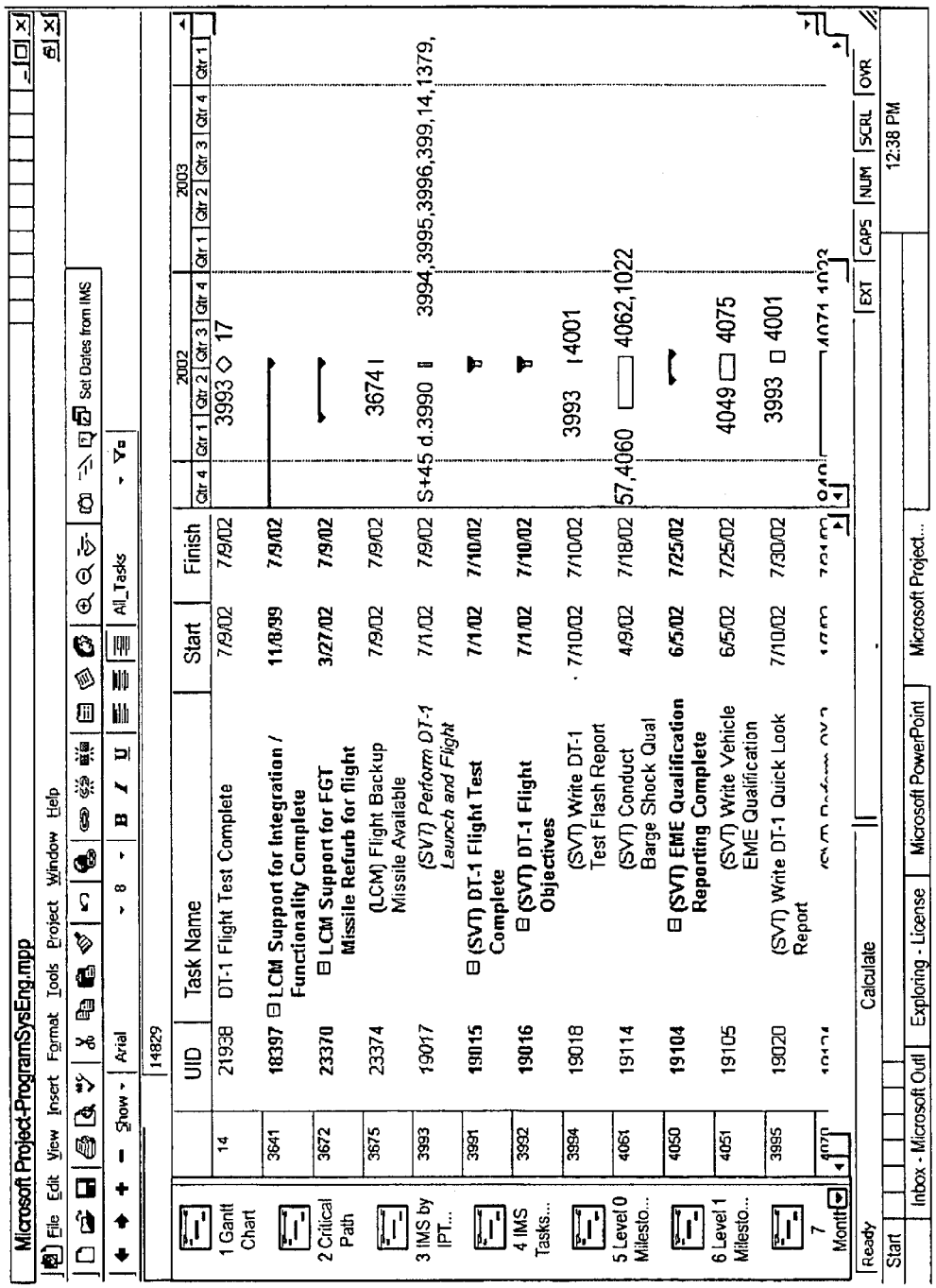
FIG. 3 is an example of an Integrated Master Schedule chart generated by a Microsoft Project software program.
Figure 4:
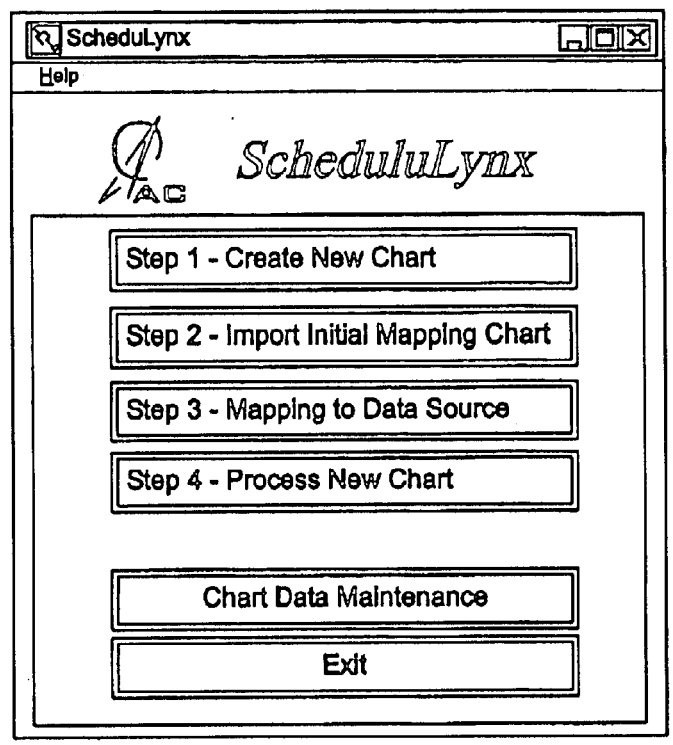
FIG. 4 is a screen shot of a main window generated by the computer system of the present invention.
Figure 5:
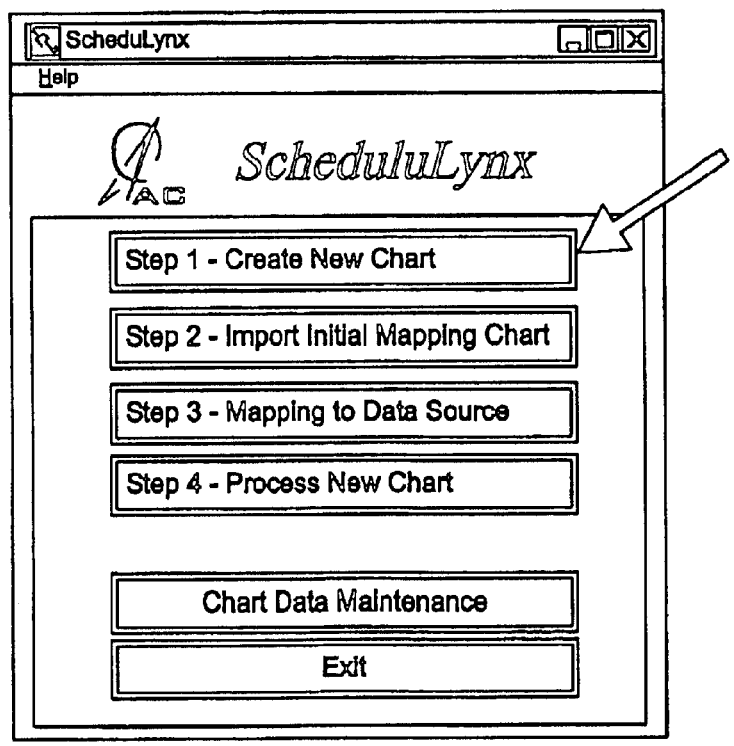
FIG. 5 is a screen shot of the main window generated by the computer system of the present invention with an arrow pointing to a "Step 1—Create New Chart" button.
Figure 6:
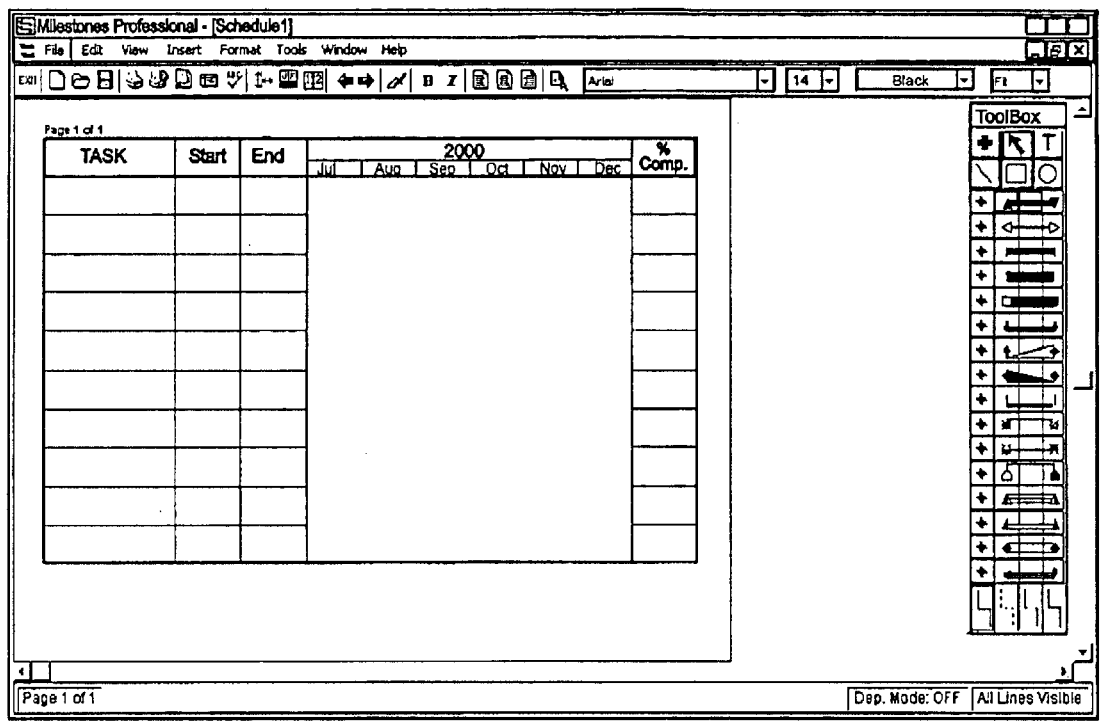
FIG. 6 is a screen shot of a window generated by the computer system of the present invention when a user clicks on the "Step 1—Create New Chart" button.

To facilitate the generating and updating of graphic-oriented project management scheduling charts (GOPMSCs), the Update Module generates and presents a series of windows to a user. The main window generated by the Update Module is shown in FIG. 4 and includes several buttons that a user can click on using a mouse. Referring to FIG. 5, the first button, which reads "Step 1—Create New Chart," is used to create a GOPMSC using the GOPMSC Module. When a user clicks on the first button, the system opens the GOPMSC Module and the user is presented with the window shown in FIG. 6. At this point, the GOPMSC Module is running and a user may create a GOPMSC. The GOPMSC Module provides a user with many different types of chart data elements including symbols and bars, custom symbols, freeform text, simple scheduling, smart columns, optional graphs, hyperlinks from symbols to documents, to other charts, or to Universal Resource Locators (URLs), and paste charts into Microsoft Word and PowerPoint. The GOPMSC Module also includes a calendar Punction, a dependency mode, a free viewer, and is Internet Browser capable. The use of a GOPMSC Module to generate GOPMSCs is well known in the art and, accordingly, will not be discussed in further detail.

Figure 7:
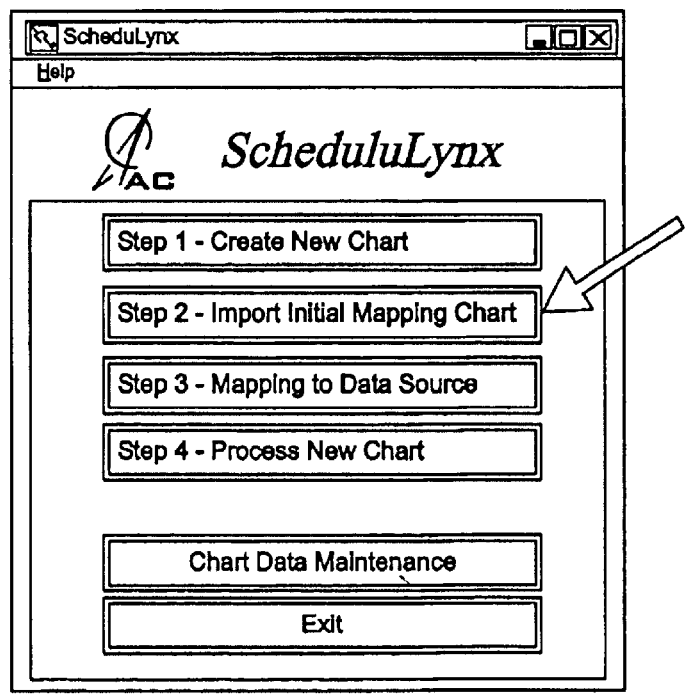
FIG. 7 is a screen shot of the main window generated by the computer system of the present invention with an arrow pointing to a "Step 2—Import Initial Mapping Chart" button.
Figure 8:
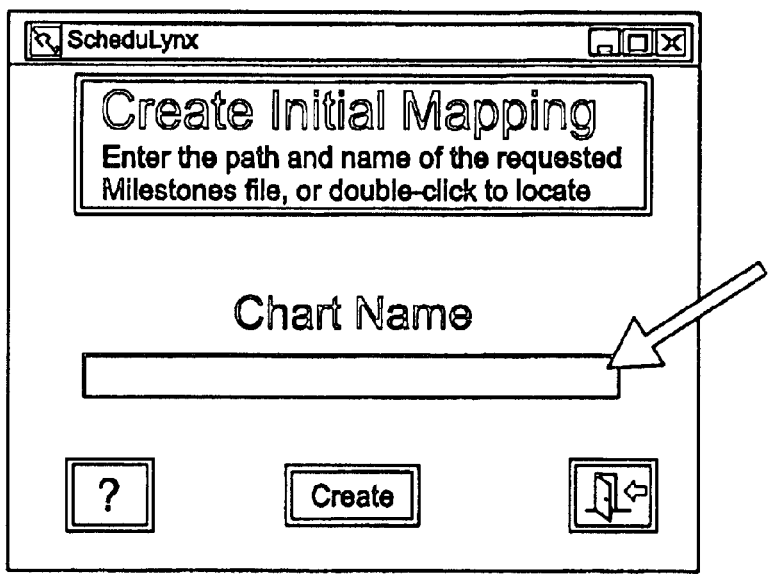
FIG. 8 is a screen shot of the window generated by the computer system of the present invention when a user clicks on the "Step 2—Import Initial Mapping Chart" button.

A second button, which reads "Import Initial Mapping Chart," (FIG. 7) is used to import a GOPMSC into the Database Module. When a user clicks on this button, another window, shown in FIG. 8, is generated by the Update Module of the present invention and prompts a user to enter the path and name of the GOPMSC to be imported. The GOPMSC may be a chart generated using the system of the present invention or a chart generated using another system. If the user does not remember the name of the chart, the user can double-click in the Chart Name text box and browse to find the chart file. Once the path and name of the chart are entered, the user clicks on the "Create" button, and the Update Module automatically imports the identified GOPMSC into the Database Module, assigns a chart identifier number (CID) to each chart data element in the Milestones chart, and stores this information in a database generated by the Database Module. The CID is a number used to uniquely identify each chart data element in the Milestones chart.

Figure 9:
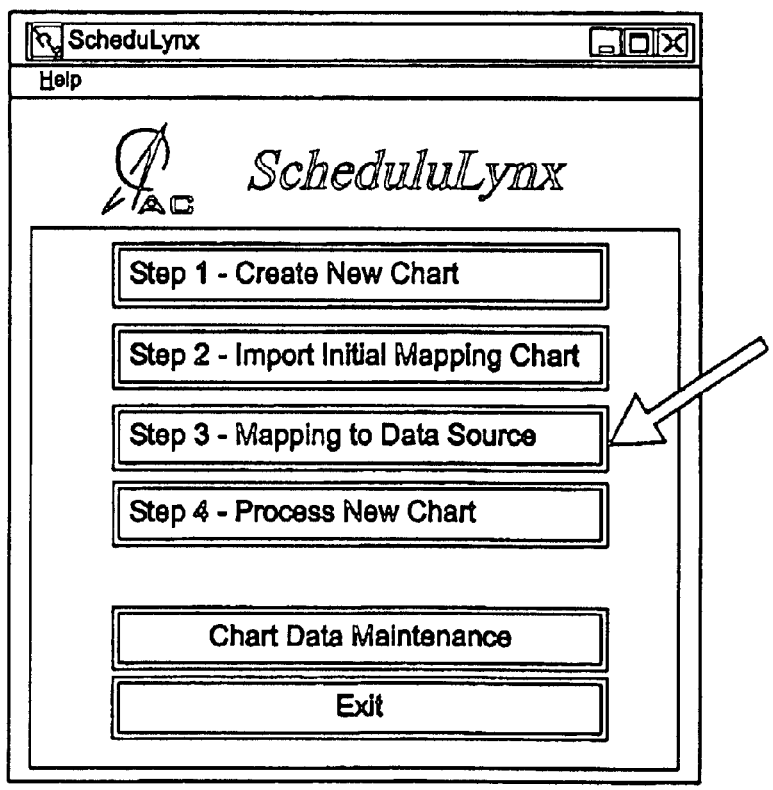
FIG. 9 is a screen shot of the main window generated by the computer system of the present invention with an arrow pointing to a "Step 3—Mapping to Data Source" button.
Figure 10:
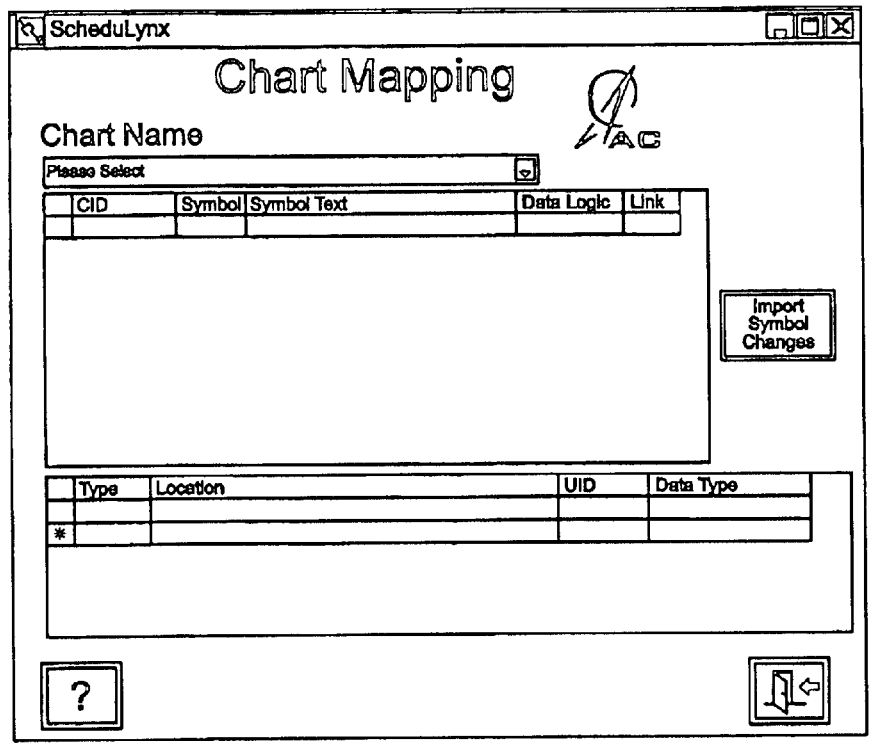
FIG. 10 is a screen shot of the window generated by the computer system of the present invention when a user clicks on the "Step 3—Mapping to Data Source" button.

Once the GOPMSC has been imported, the user can click on the "Mapping to Data Source" button (FIG. 9) in order to map the CIDs generated in the previous step to multiple source data elements in one or more DOPMSCs or GOPMSCs, e.g., data sources. When the user clicks on this button, the Update Module generates the window shown in FIG. 10, which prompts the user to input the chart name or to select it from a pull down menu. When the user selects a chart, the Update Module generates a window showing the CID number assigned to each chart data element, the name of the chart data element, any associated text, and information identifying one of the multiple source data elements to be used when generating an updated version of the GOPMSC, which may be changed by a user.

Figure 11:
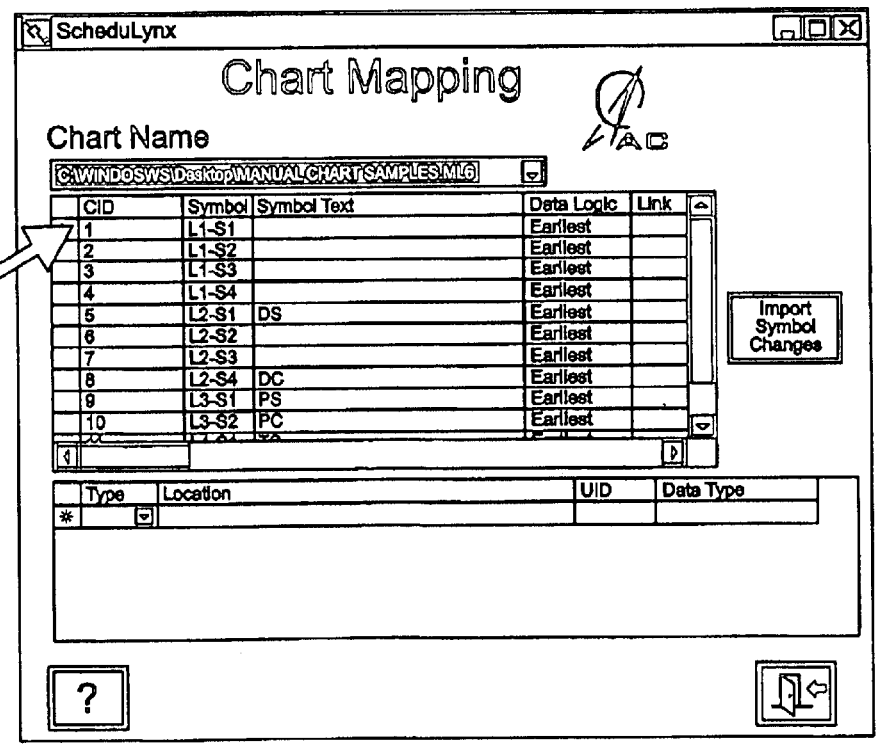
FIG. 11 is a screen shot of a window generated by the computer system of the present invention when a user selects a GOPMSC showing the chart identification number (CID) for each symbol in the chart, along with the symbol name, symbol text, and the default associated Date Logic.

For example, referring to FIG. 11, the window generated in one embodiment of the Update Module includes the CID, the name of each symbol associated with each CID, text associated with each symbol, and date logic associated with each CID. The Date Logic field associated with each CID allows a user to input information identifying one of the multiple source data elements linked to a CID to be used when generating updated versions of the GOPMSC. In the example shown in FIG. 11, each chart data element, i.e., symbol, has an associated date and the multiple source data elements to be linked to the chart data element also have associated dates. By selecting the "Earliest" setting, which is the default setting for one embodiment of the Update Module of the present invention, in the Date Logic field, a user provides information indicating that the source data element having the earliest date should be selected when generating updated versions of the GOPMSC. By selecting the "Latest" setting (not shown in FIG. 11), a user provides information indicating that the source data element having the latest date should be selected when generating updated versions of the GOPMSC. In other embodiments, other types of selection criteria may be used to identify one of the multiple source data elements to be used when generating updated versions of GOPMSCs.

Figure 12:
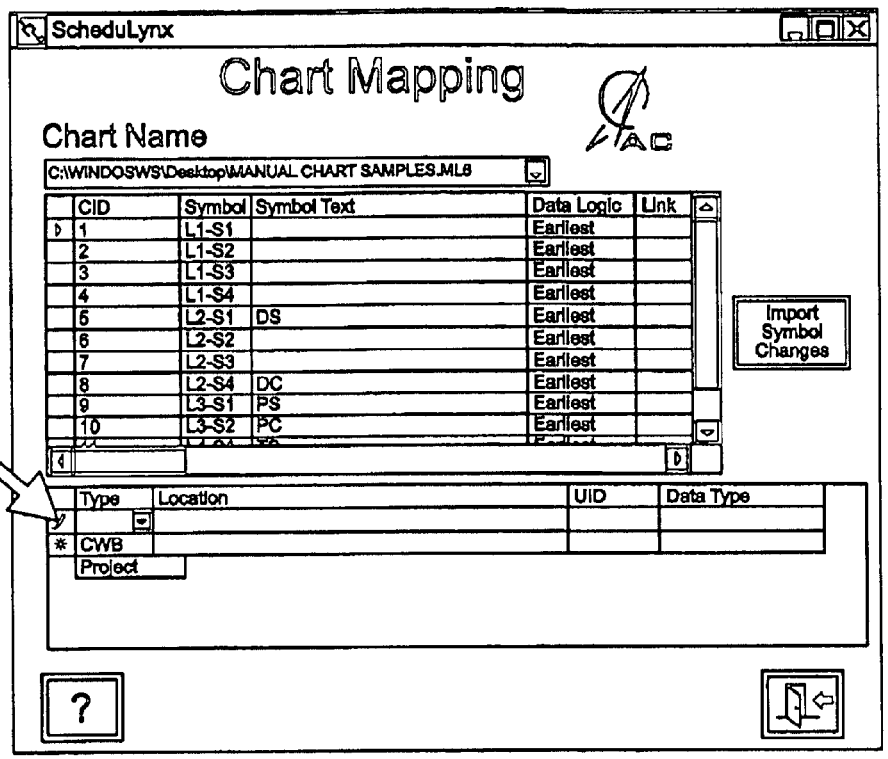
FIG. 12 is a screen shot of a window generated by the computer system of the present invention showing a user inputting a data source type.
Figure 13:
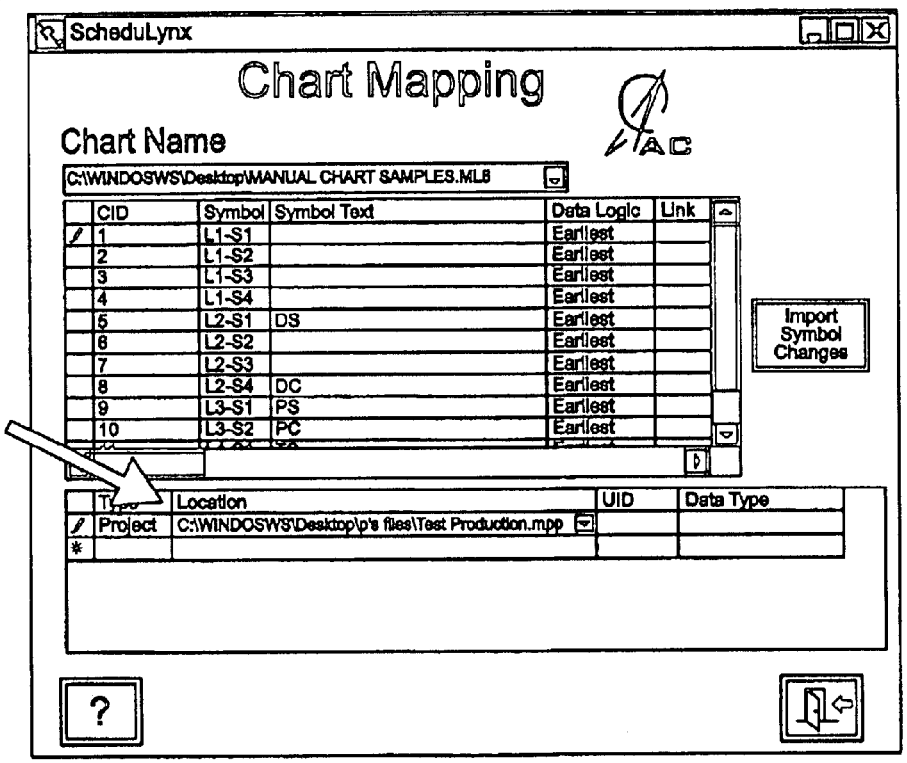
FIG. 13 is a screen shot of a window generated by the computer system of the present invention showing a user inputting a location for a data source.
Figure 14:
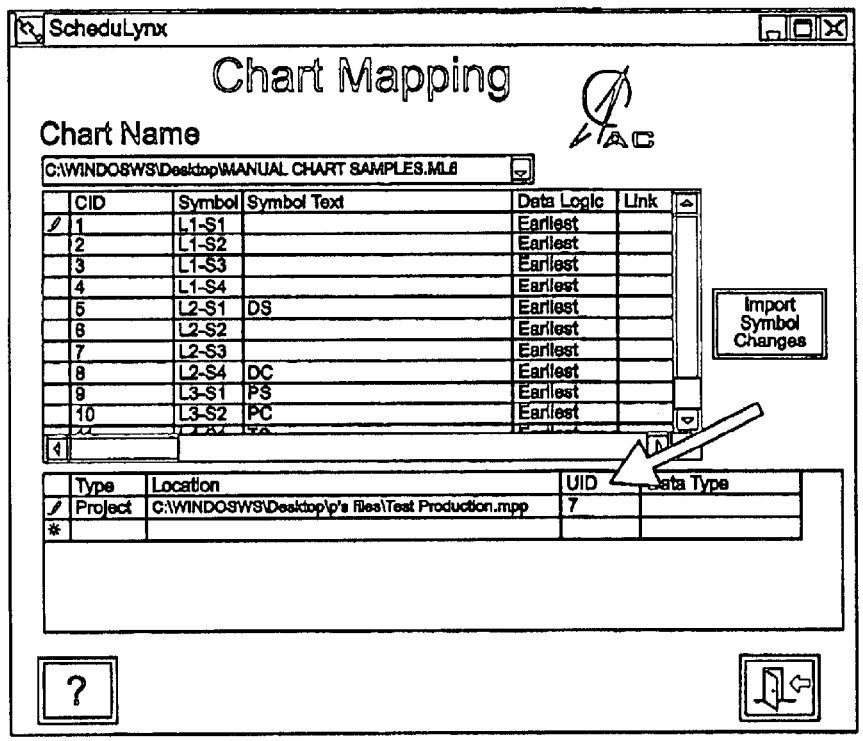
FIG. 14 is a screen shot of a window generated by the computer system of the present invention showing a user inputting a unique identification number (UID) for a data element in a data source.
Figure 15:
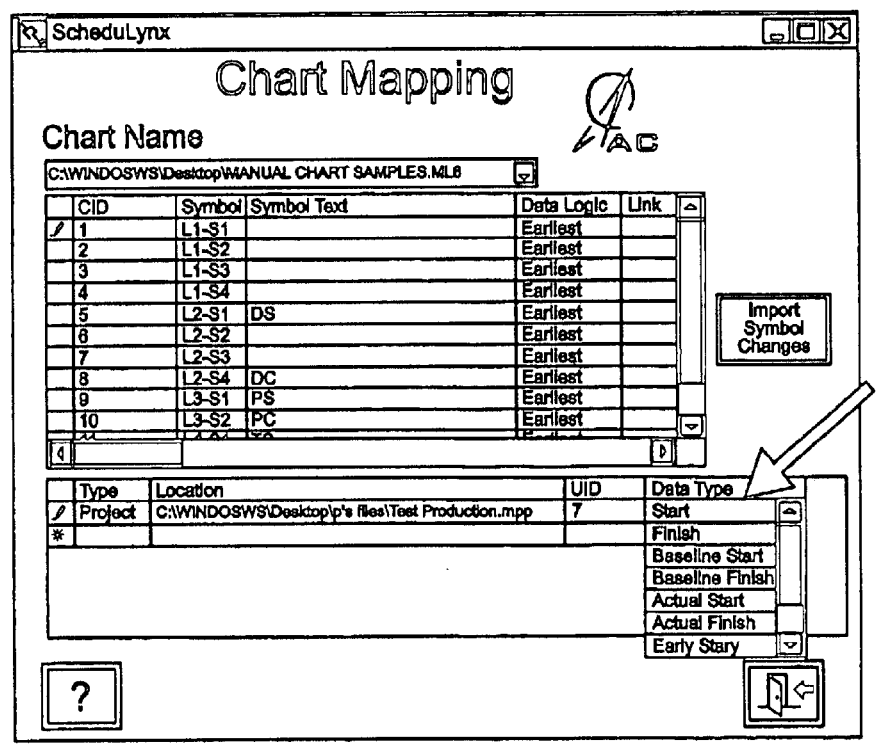
FIG. 15 is a screen shot of a window generated by the computer system of the present invention showing a user inputting a Data Type for a data element in a data source.

Referring to FIG. 12, the user next enters the type of data source to be mapped to each chart data element in the GOPMSC. As shown in FIG. 12, the user can map each chart data element to a CWB file, which is an Excel file having an extension of .xls, or a Project file, which is a Microsoft Project file having an extension of .mpp. In other embodiments, other types of data files may be used as well. The next step for the user, as shown in FIGS. 13 and 14, is to enter the location of the data source file and a unique identification number (UID) for each source data element in the data source file. Finally, the user inputs information describing the type of source data element to be linked. For example, referring to FIG. 15, the user selects a Date Type applicable to a UID. In this example, the source data element includes date information and may be described as a Start date, Finish date, Baseline Start date, Baseline Finish date, Actual Start date, Actual Finish date, or Early Start date. Those skilled in the art will recognize that these descriptions are commonly used when referring to chart data elements in GOPMSCs and DOPMSCs. Once a CID is linked, i.e., mapped to data, an icon appears in the Link Field for that CID (FIG. 16).

Figures 16, 17:
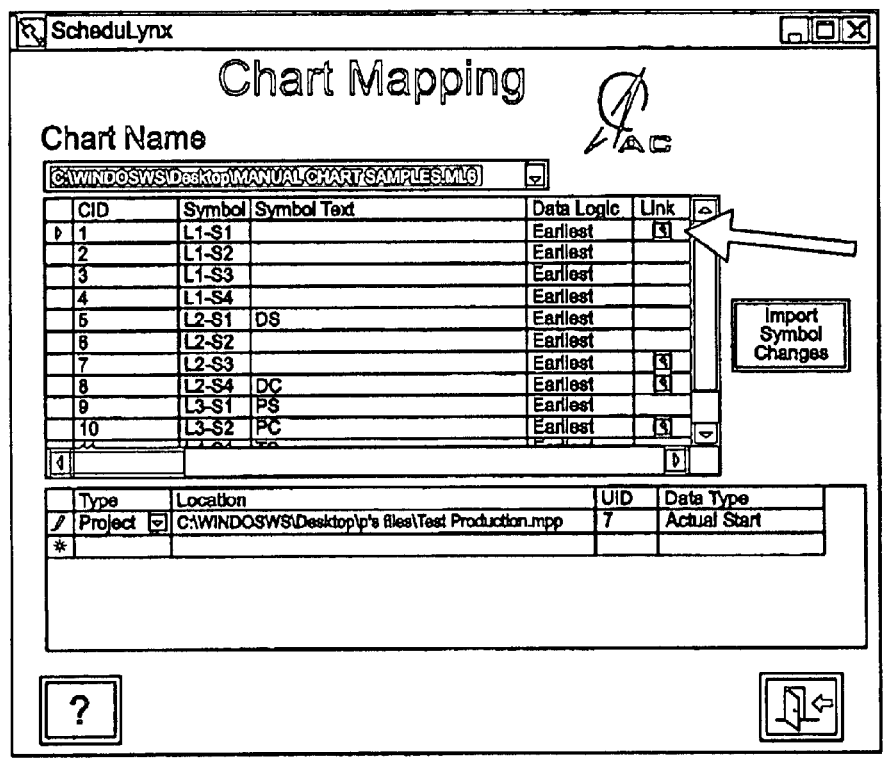
FIG. 16 is a screen shot of a window generated by the computer system of the present invention showing an icon in a link field, indicating that a CID is linked to a data element in a data source.
FIG. 17 is a screen shot of a window generated by the computer system of the present invention showing an "Import Symbol Changes" button.

If the user makes any changes, such as adding new chart data elements to the Milestones Professional chart after mapping data, the user can click on the "Import Symbol Changes" button as shown in FIG. 17 to import these new chart data elements into the database generated by the Database Module. Note that the Update Module will only import the new chart data elements and will not import the entire GOPMSC again.

Figure 18:
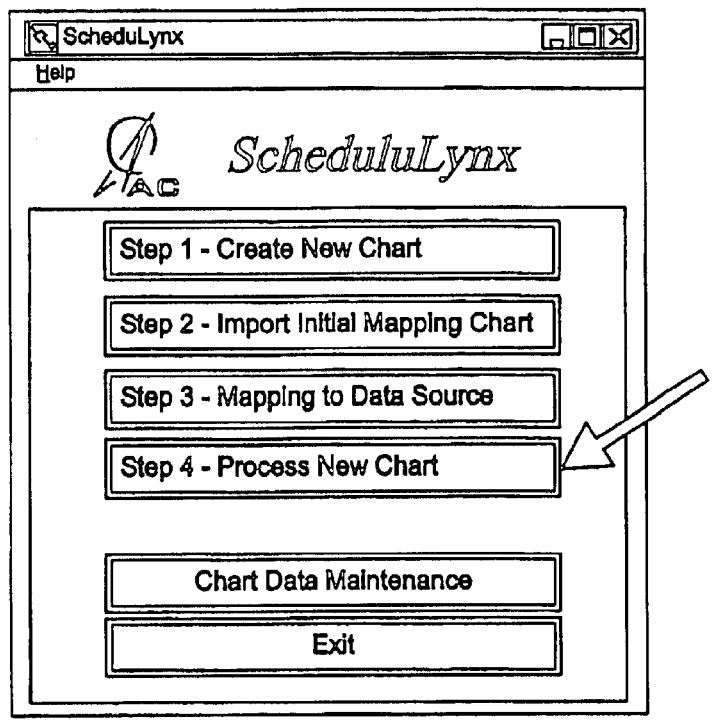
FIG. 18 is a screen shot of the main window generated by the computer system of the present invention with an arrow pointing to a "Step 4—Process New Chart" button.
Figure 19:
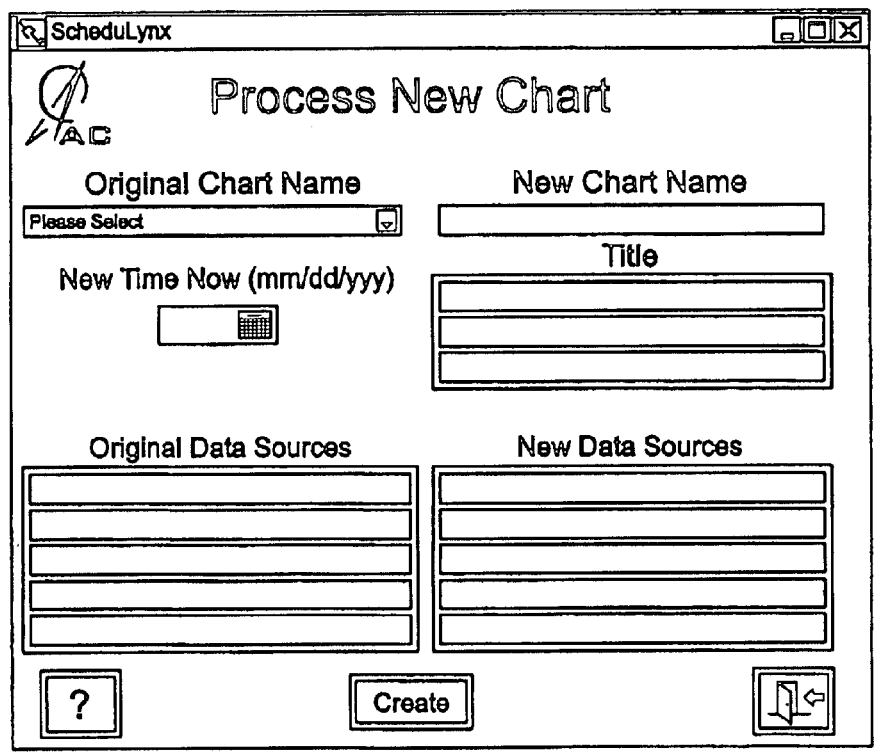
FIG. 19 is a screen shot of the window generated by the computer system of the present invention when a user clicks on the "Step 4—Process New Chart" button.

Referring to FIG. 18, the user can click on the "Step 4—Process New Chart" button to generate an updated version of the GOPMSC originally created in Milestones Professional. When the user clicks on this button, the Update Module generates the window shown in FIG. 19, which includes an Original Chart Name text box, a New Chart Name text box, a Title text box, a New Time Now text box, Original Data Sources text boxes, and New Data Sources text boxes. Using a pull down arrow on the Original Chart Name text box, the user can select a GOPMSC to update. In response, the Update Module will automatically create a New Chart Name by adding an extension of _RX.ml6 to the original chart name. In addition, the user can type in a new title in the Title text box and select a new time now using the calendar icon next to the New Time Now text box. The New Time Now is simply the date that the updated version of a GOPMSC is created.

The Update Module also displays information identifying the location of the data sources originally mapped to the selected GOPMSC in the Original Data Sources text boxes. If the user has updated these original data sources and would like to generate an updated chart, he can simply click on the "Create" button and the Update Module will automatically generate a new GOPMSC using the updated data in the original data sources. More specifically, the Update Module reads the maps associated with the GOPMSC, identifies one of the multiple source data elements in the original data sources linked to each chart data element in the GOPMSC to be used to generate the updated version of the GOPMSC, retrieves the identified source data elements from the original data sources, and generates the updated version of the GOPMSC using the retrieved source data elements. If the user would like to map the original GOPMSC to new data sources, the user can type in the location of any new data sources in the New Data Sources text boxes, click on the "Create" button, and the Update Module will generate a new GOPMSC using the new data sources. In this case, the Update Module reads the maps associated with the GOPMSC, identifies one of the multiple source data elements in the new data sources linked to each chart data element in the GOPMSC to be used to generate the updated version of the GOPMSC, retrieves the identified source data elements from the new data sources, and generates the updated version of the GOPMSC using the retrieved source data elements.

Figure 20:
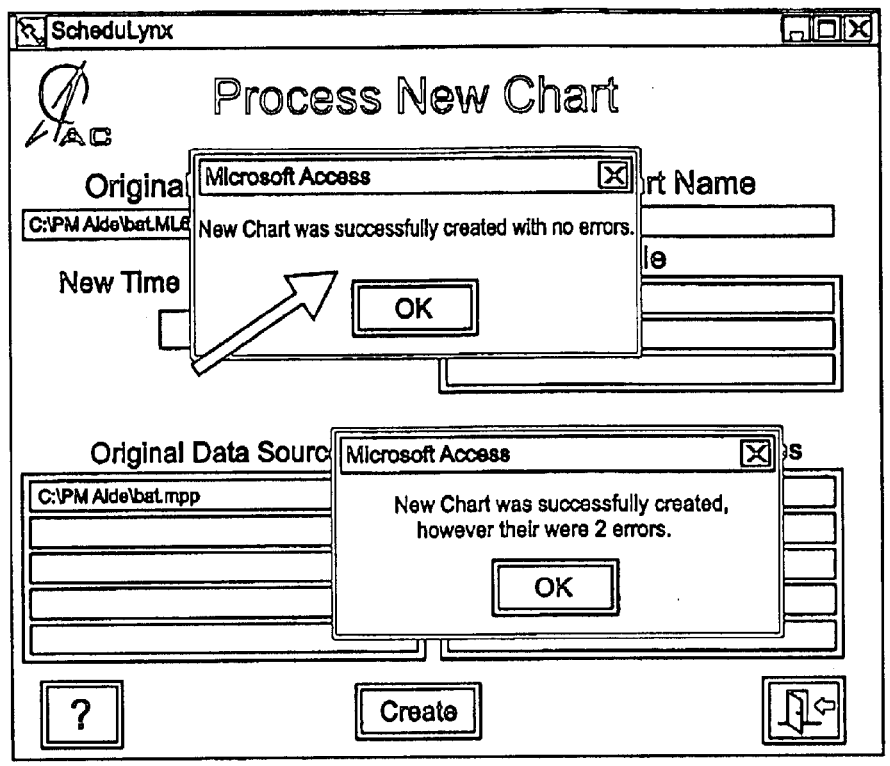
FIG. 20 is a screen Shot of a New Chart Dialogue Box generated by the computer system of the present invention when a user clicks on the "Create" button in FIG. 19.
Figure 21:
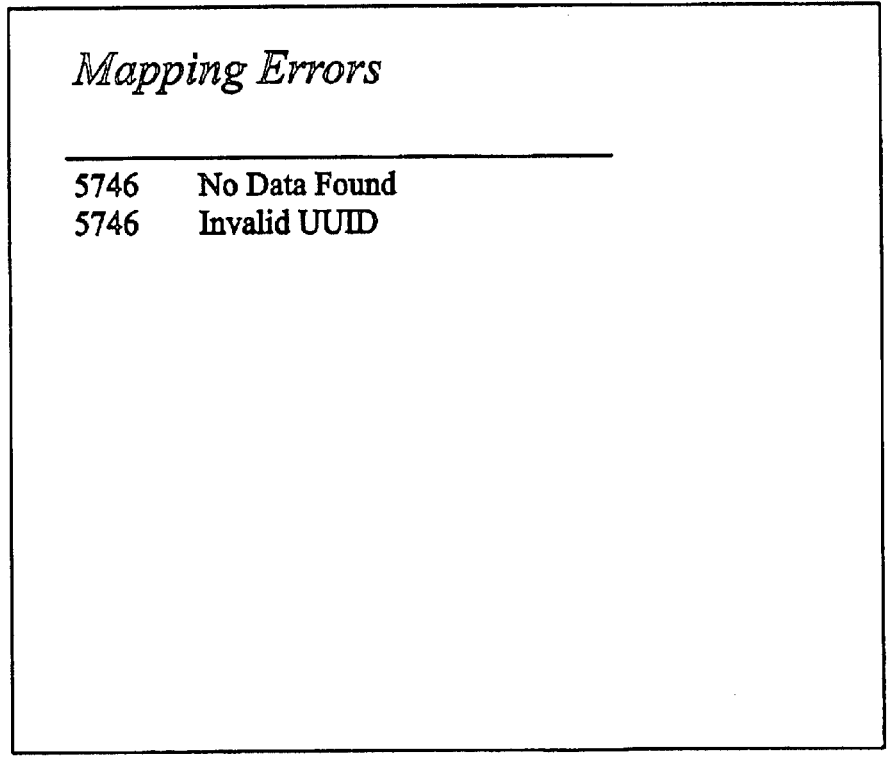
FIG. 21 is a screen shot of a window generated by the computer system of the present invention showing a mapping errors report.
Figure 22:
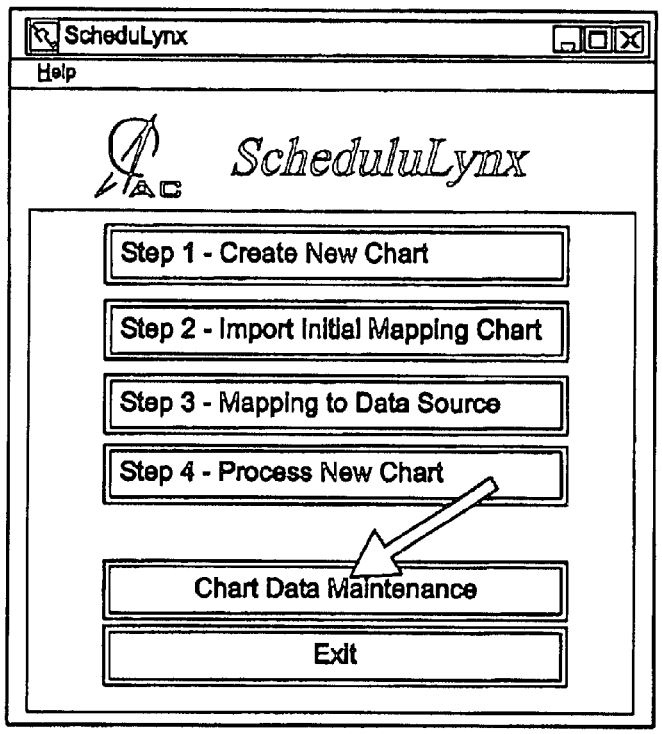
FIG. 22 is a screen shot of a New Chart Dialogue Box generated by the computer system of the present invention when a user clicks on the "Create" button in FIG. 19, indicating that a new chart was created without errors.

Once the user clicks on the "Create" button, the Update Module will generate a New Chart Dialogue Box (FIG. 20) to notify the user that the new updated GOPMSC has been successfully created "without errors" or "with errors." If there are mapping errors, the user can click on the "OK" button shown in FIG. 20 and the Update Module will generate a Mapping Errors report, showing the CID and a description of the error (FIG. 21). Referring to FIG. 22, if there are no errors, the user can click on the "OK" button and the Update Module will open the new updated GOPMSC.

Figure 23:
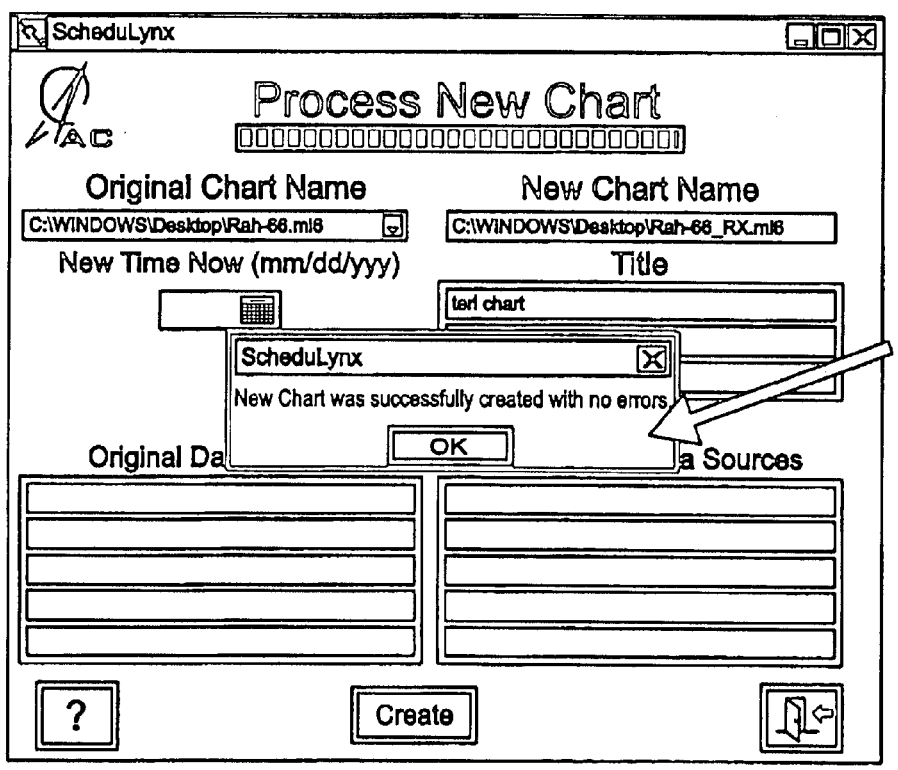
FIG. 23 is a screen shot of the main window generated by the computer system of the present invention with an arrow pointing to a "Chart Data Maintenance" button.
Figure 24:
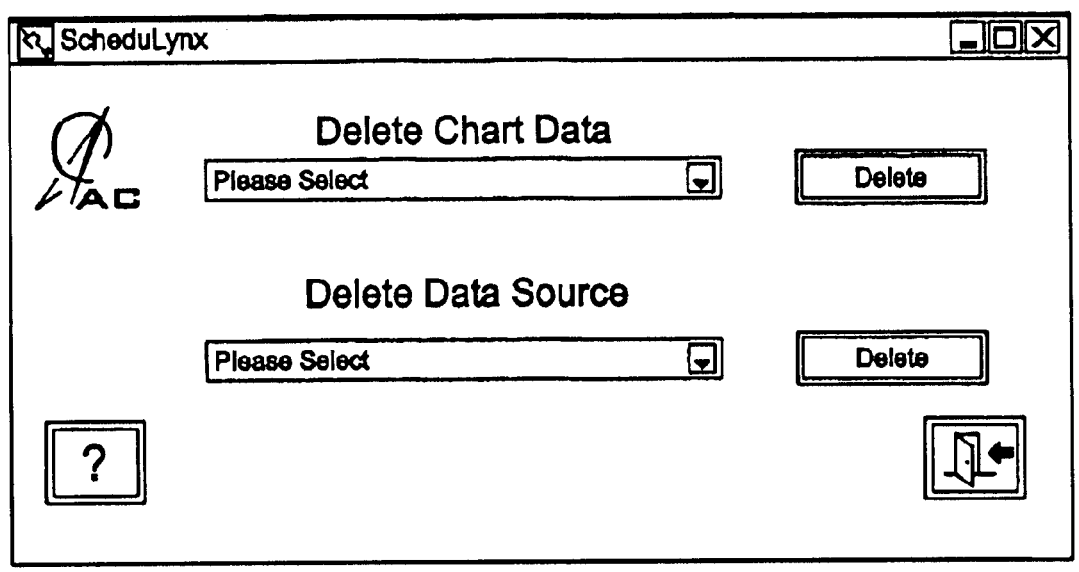
FIG. 24 is a screen shot of a window generated by the computer system of the present invention when a user clicks on the "Chart Data Maintenance" button.
Figure 25:
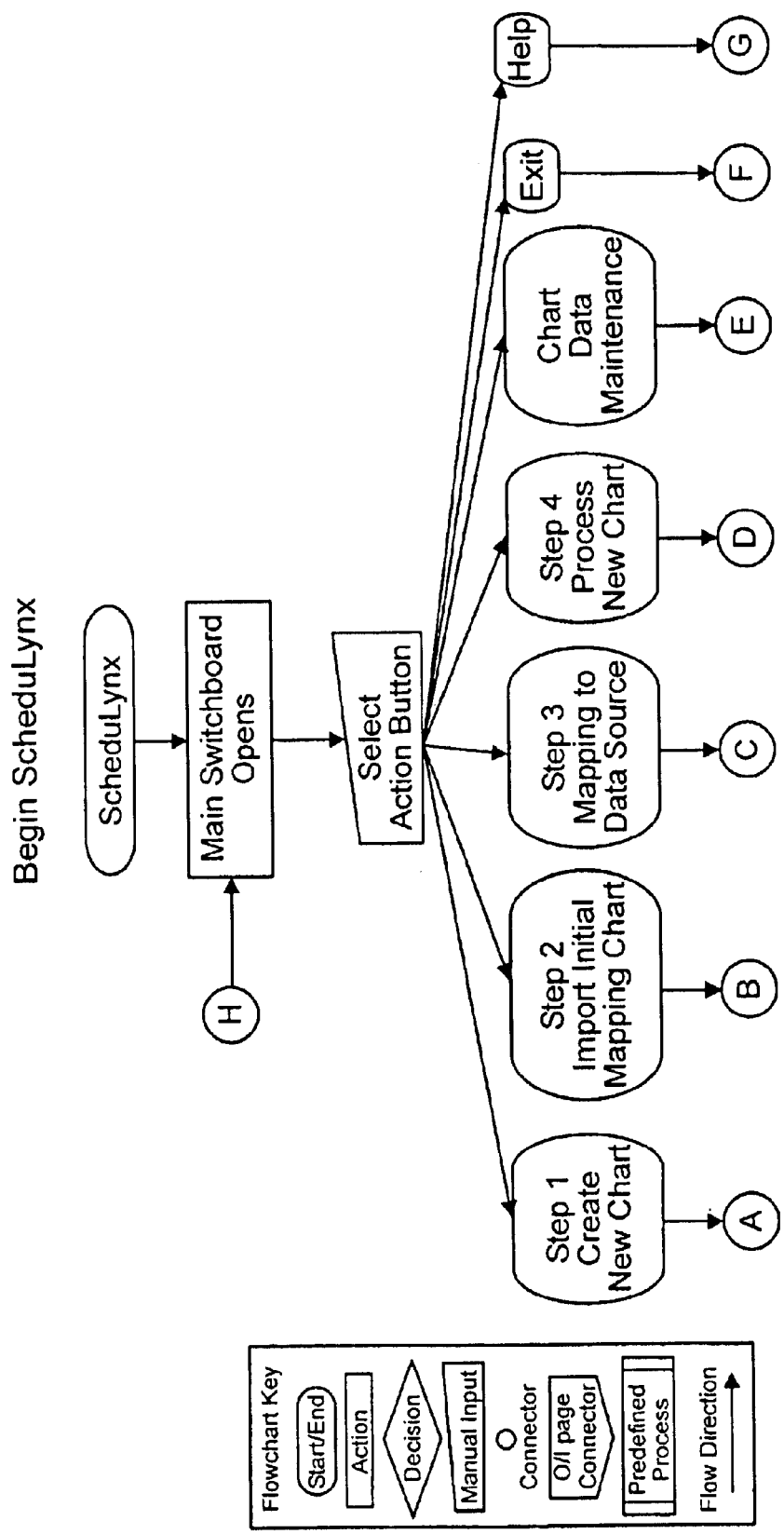
FIGS. 25–32 are flowcharts showing the functions performed by the computer system of the present invention and a person using the computer system of the present invention.
Figure 26:
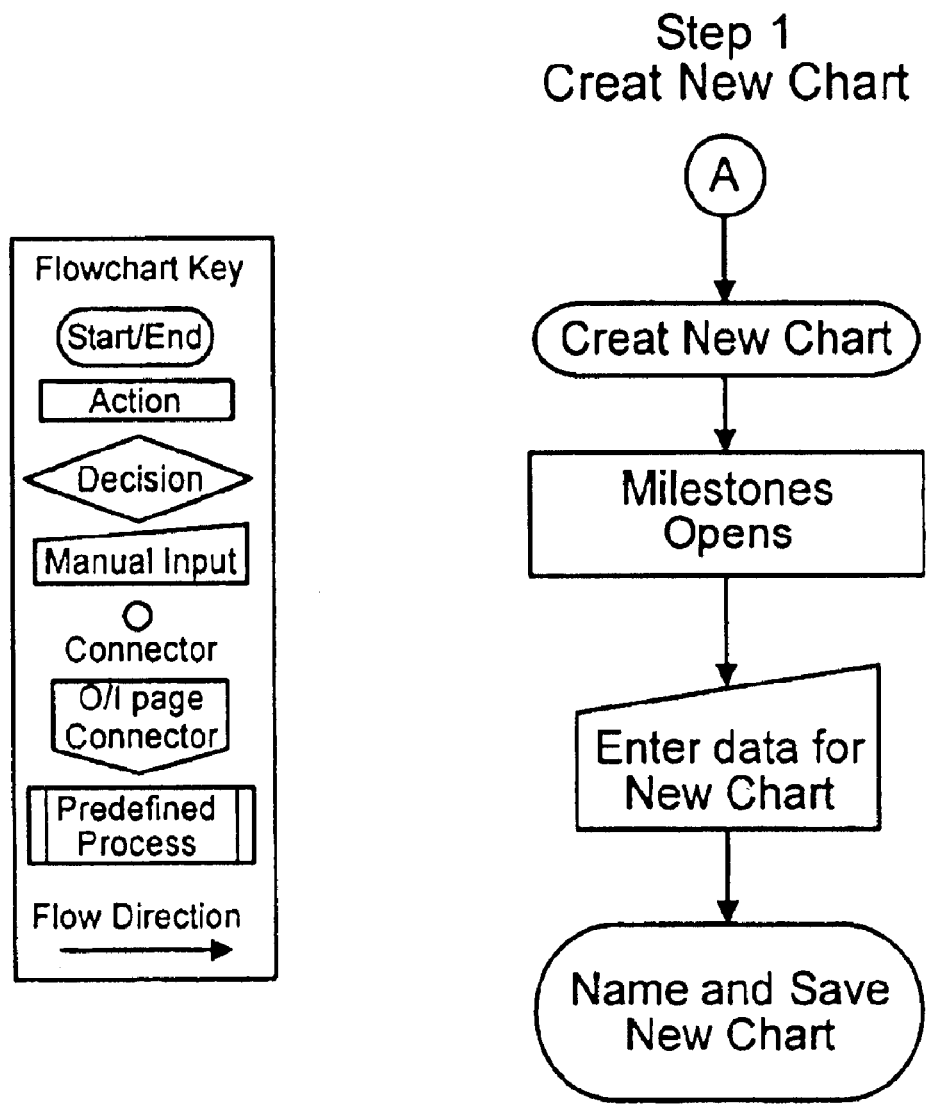
Figure 27:
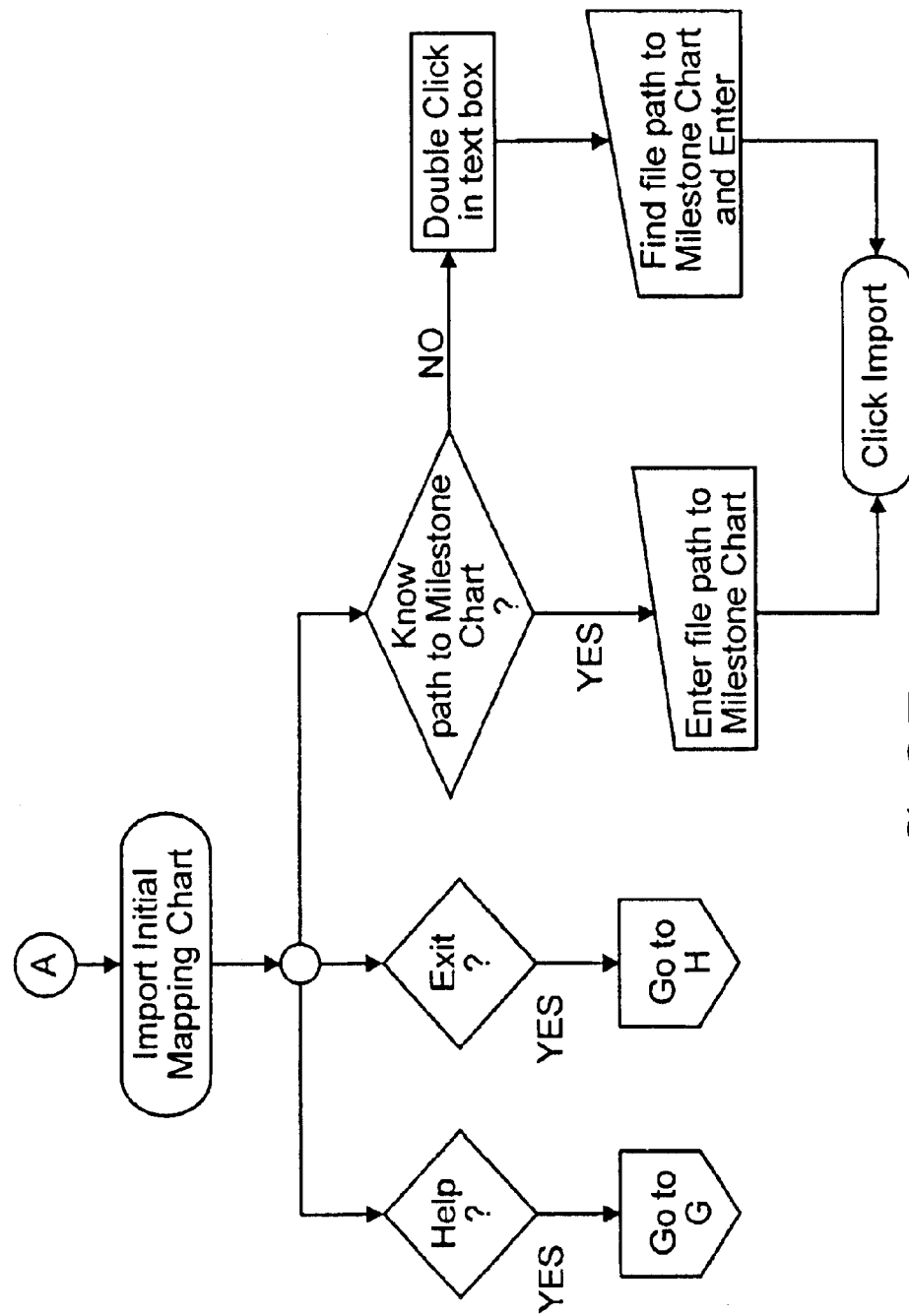
Figure 28:
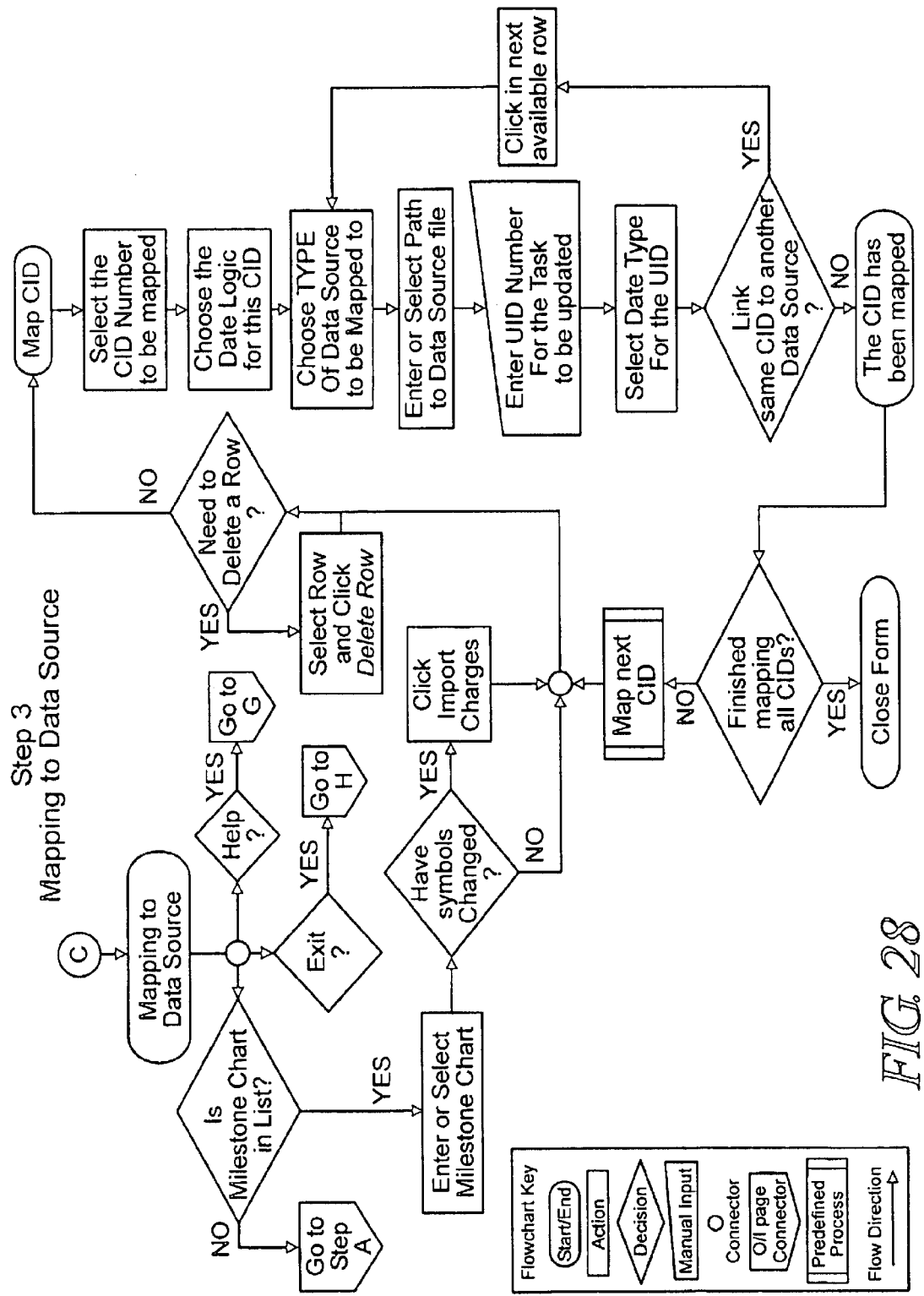
Figure 29:
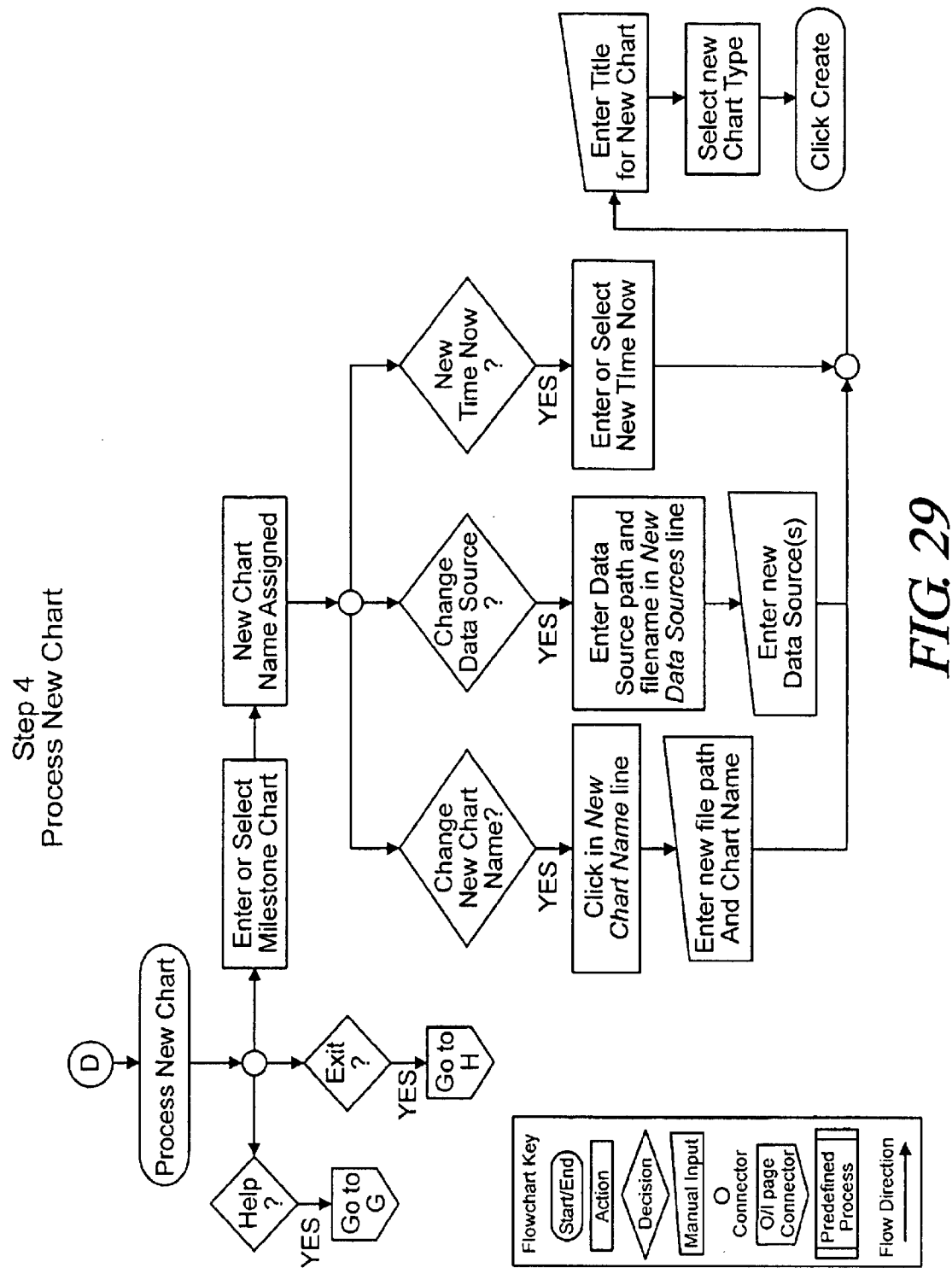
Figure 30:
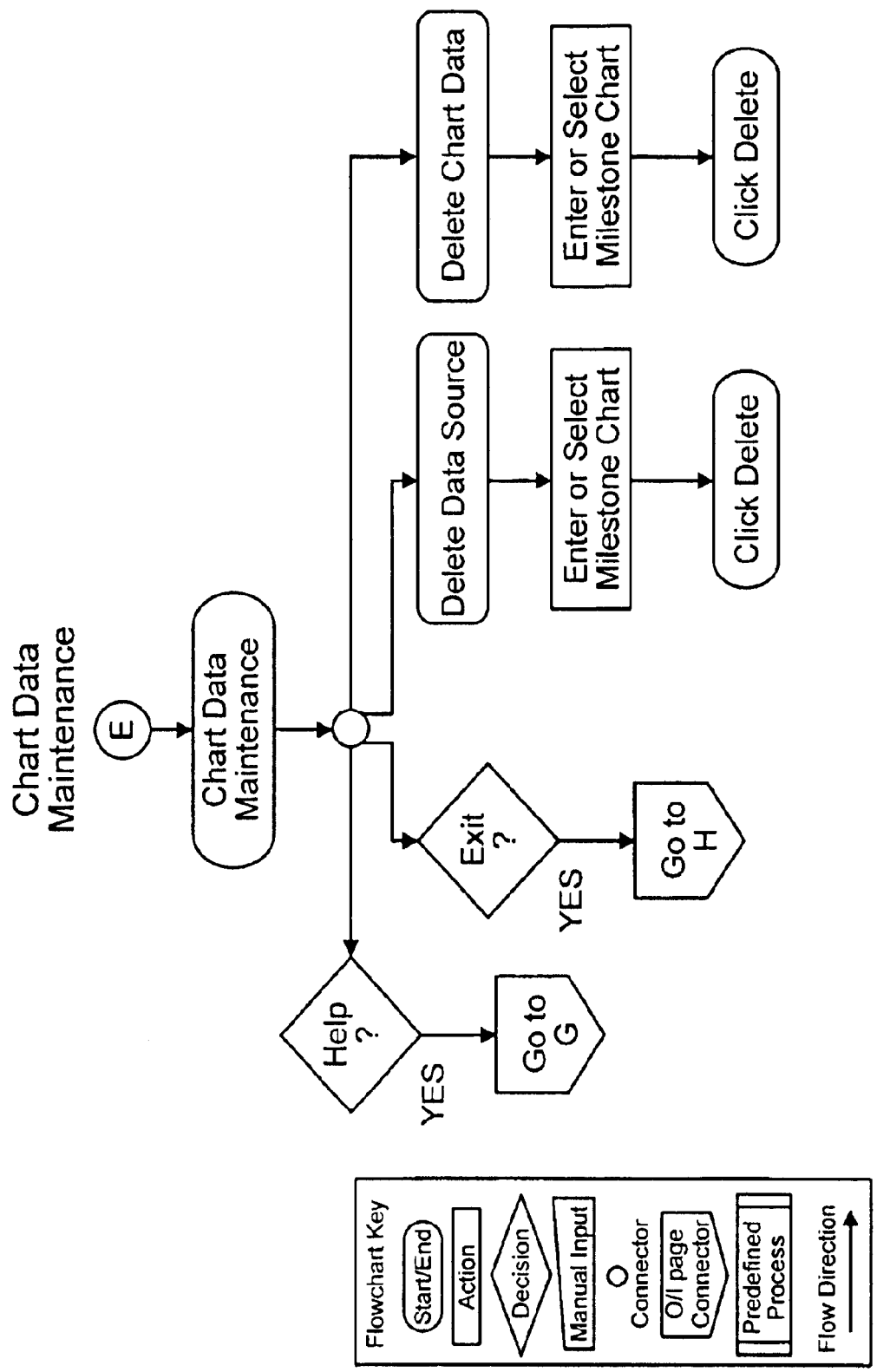
Figure 31:
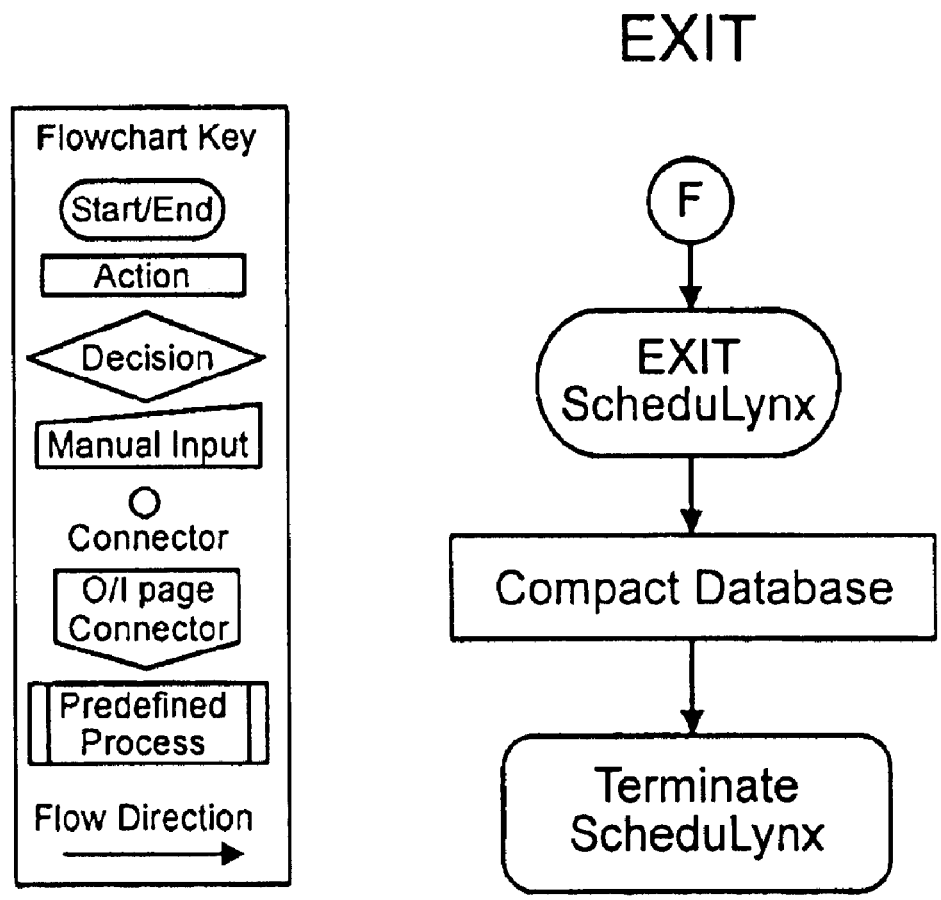
Figure 32:
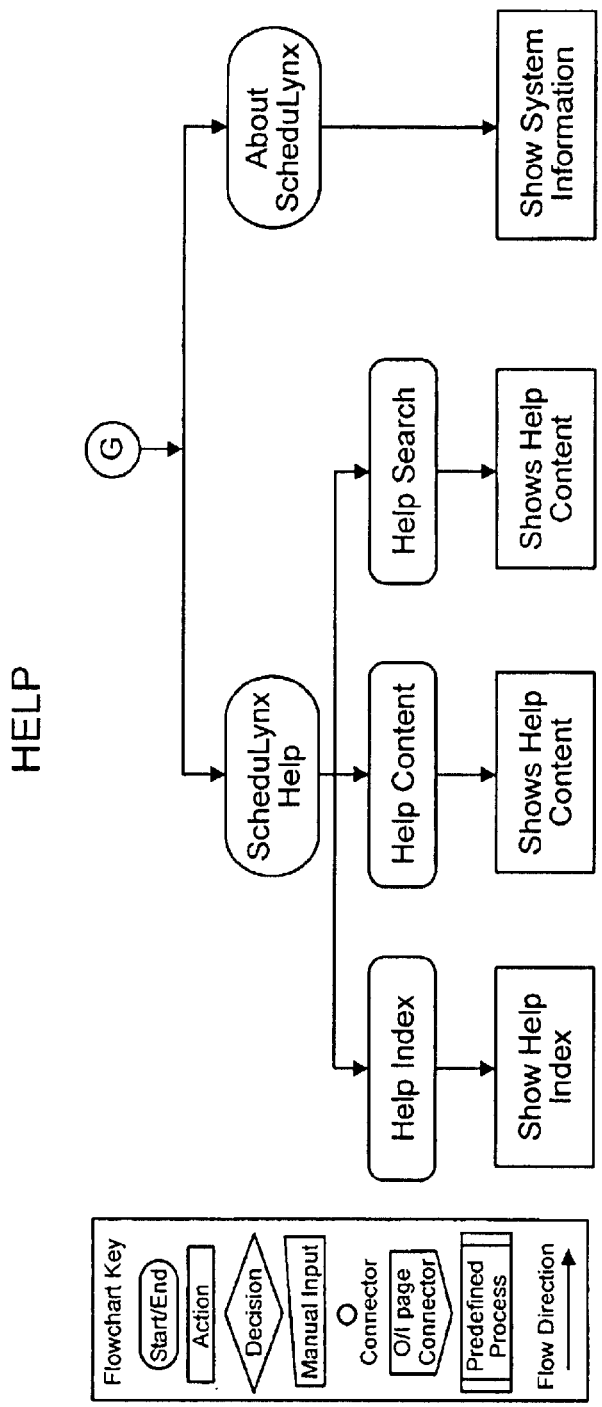

Referring FIG. 23, the user can click on the "Chart Data Maintenance" button to delete charts and data sources from the database. When the user clicks on this button, the Update Module generates the window shown in FIG. 24. The user can use the pull down arrow for the Delete Chart Data text box to select a chart and can click on the "Delete" button next to this text box to delete the selected chart. The user can also use the pull down arrow for the Delete Data Source text box to select a data source and can click on the "Delete" button next to this text box to delete the selected data source.

Figure 33:
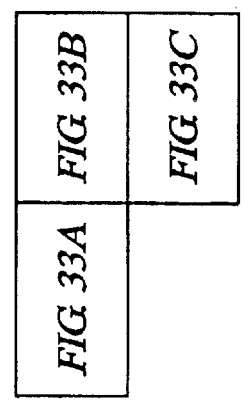
FIG. 33 is a summary flowchart showing the functions performed by the computer system of the present invention and a person using the computer system of the present invention, indicating that the computer system of the present invention can be used to generate Normal, Comparison Selective, and Comparison All graphic-oriented project management scheduling charts.
Figure 33A:
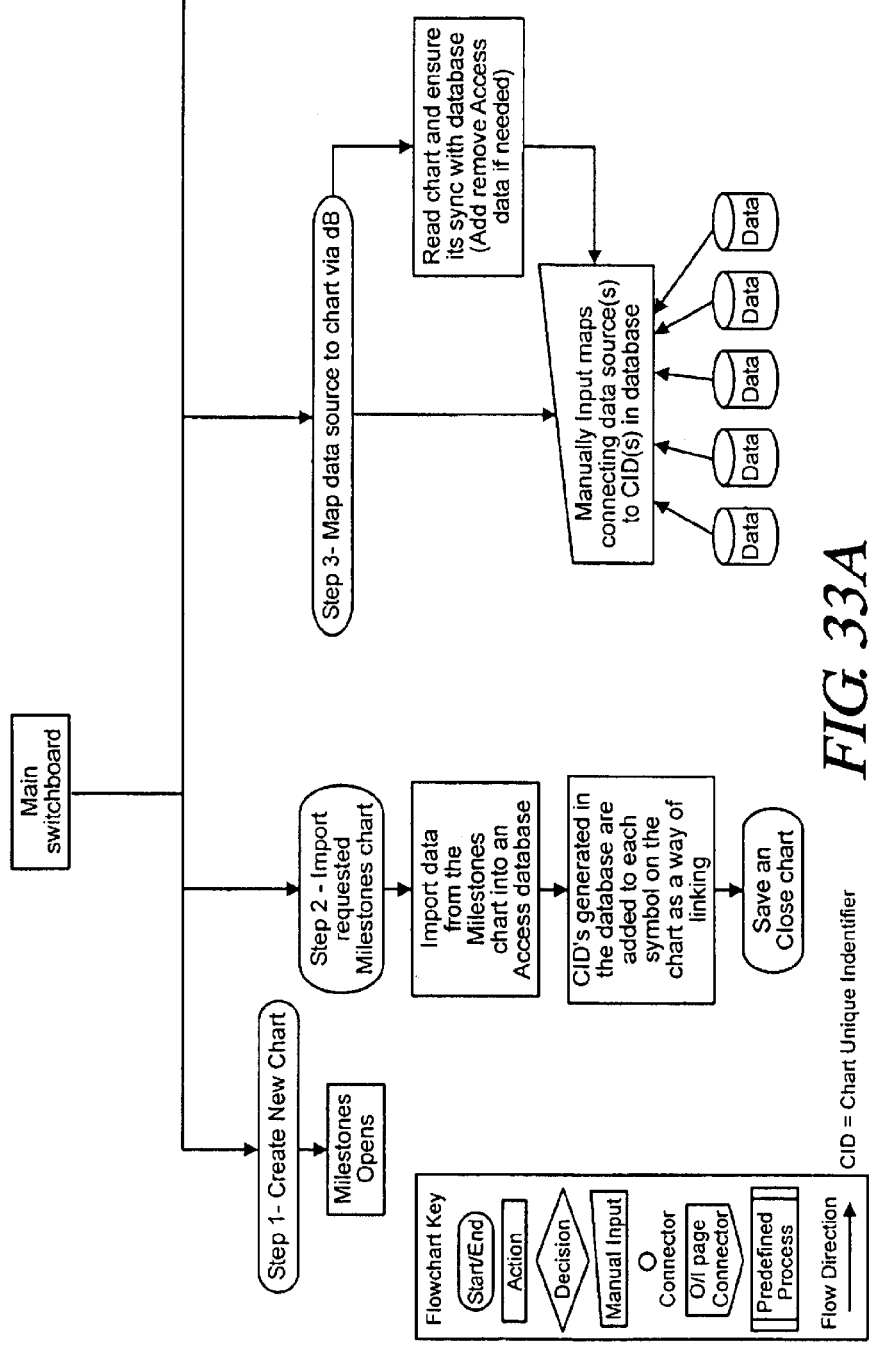
Figure 33B:
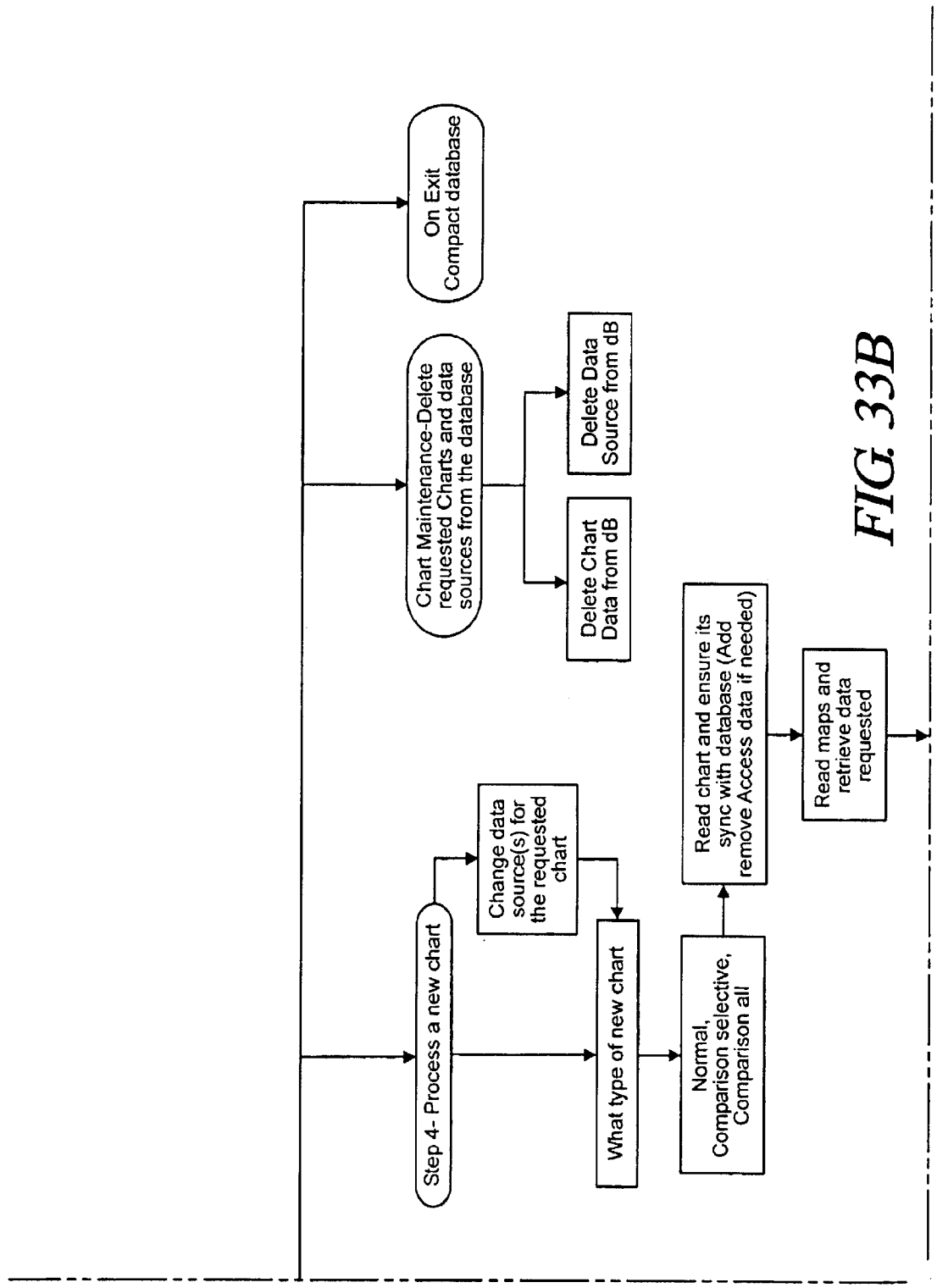
Figure 33C:
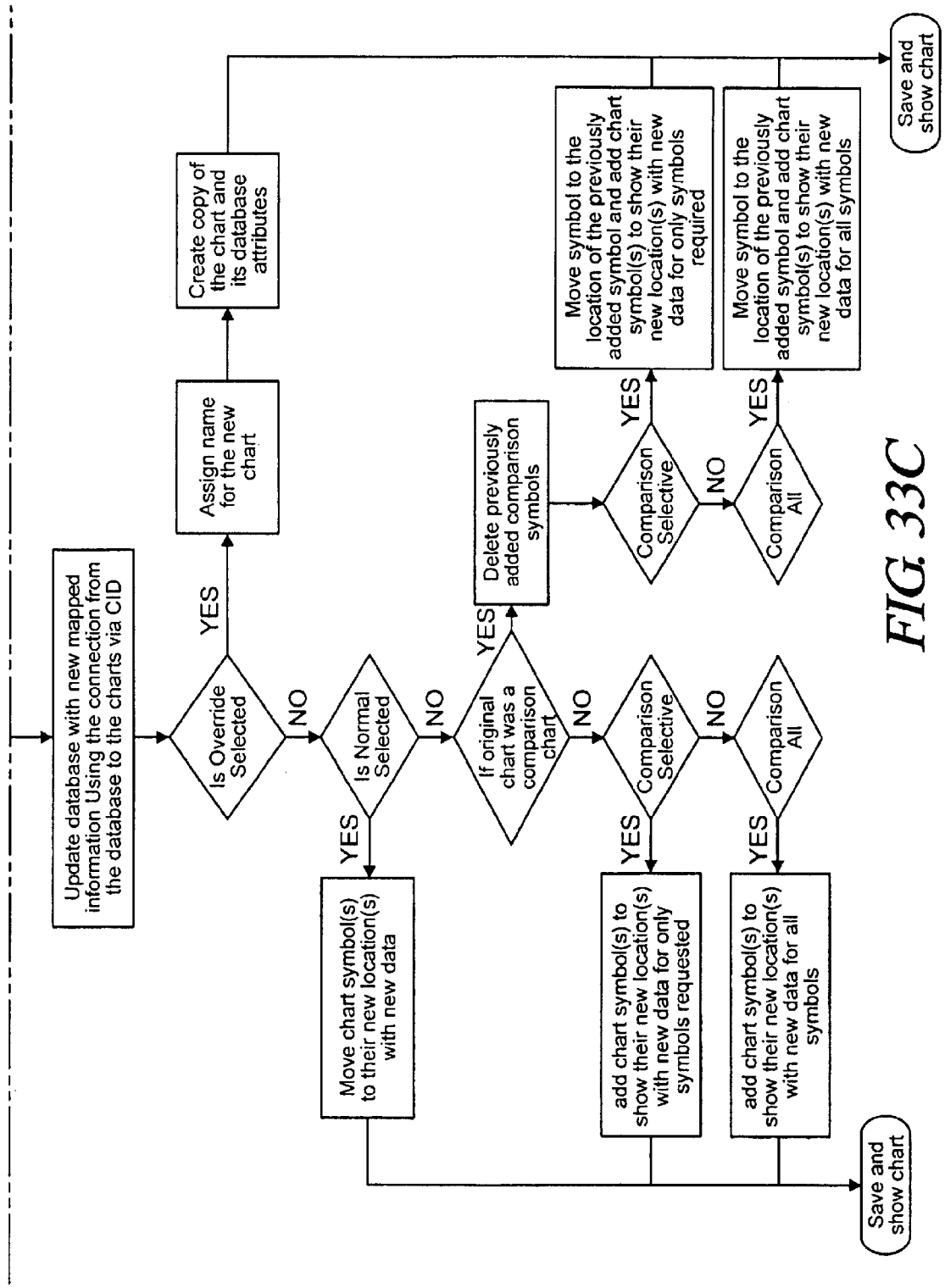

A series of flowcharts showing the functions performed by the Update Module and a person using the Update Module are shown in FIGS. 25–32. In addition, referring to FIG. 33, a summary flowchart showing the functions performed by the Update Module and a person using the Update Module is shown. As shown in the summary flowchart of FIG. 33, the Update Module can be used to generate three types of GOPMSCs: Normal, Comparison Selective, and Comparison All. A Normal GOPMSC is a chart generated using one only one set of chart data element dates. For example, FIG. 34 shows a Normal GOPMSC using only actual dates for a project. FIG. 35, on the other hand, is a Comparison Selective GOPMSC that includes the actual dates for the project as well as some of the corresponding baseline dates, i.e., the dates when certain tasks were scheduled to begin or end. Using this type of chart, one can clearly identify slips that may have occurred with regard to specific deadlines during a work project. In short, a Comparison Selective GOPMSC includes one complete set of chart data element dates, and a portion of another set of chart data element dates.

Figure 36:
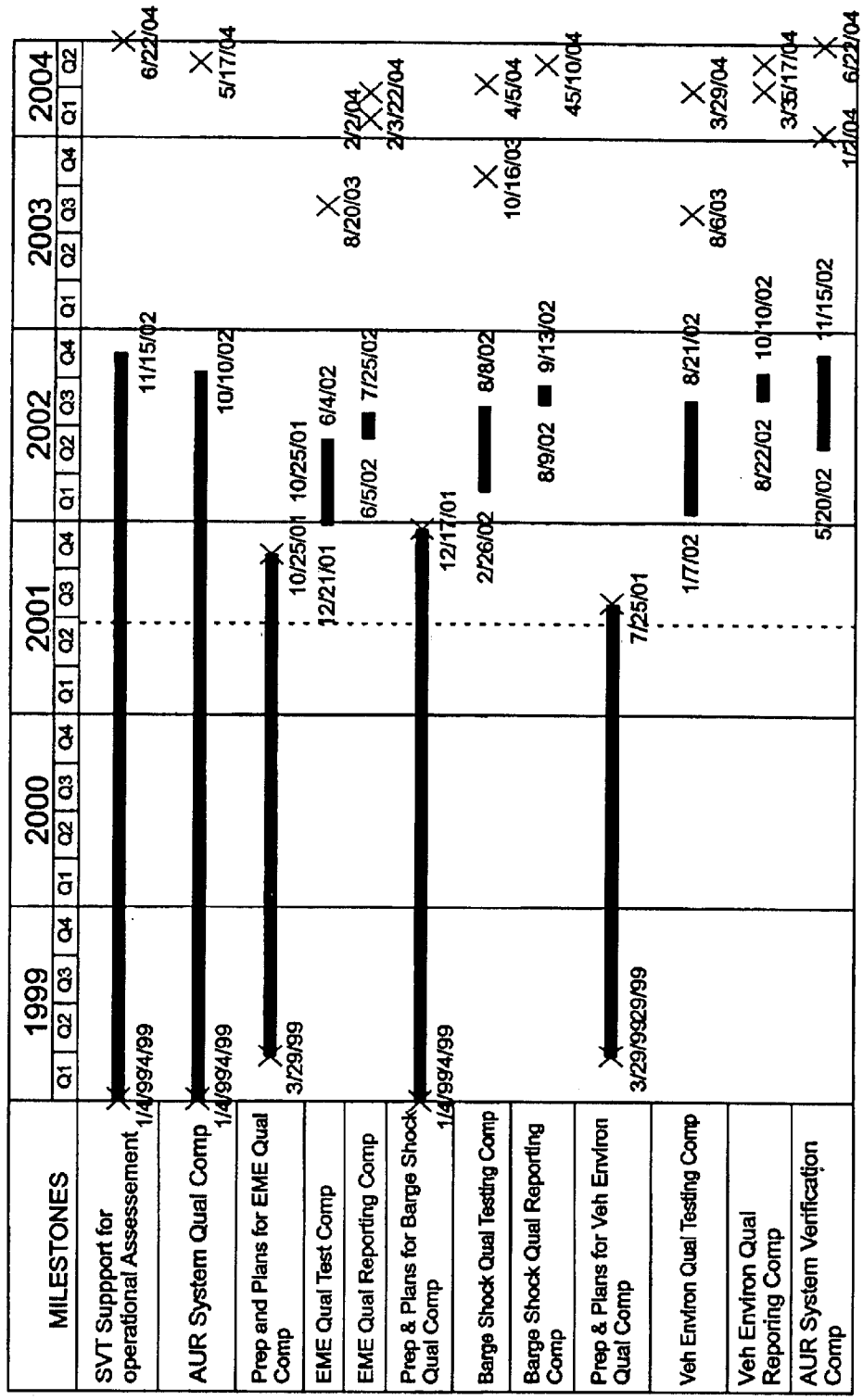
FIG. 36 is a Comparison All GOPMSC generated by the computer system of the present invention.

In a similar manner, FIG. 36 is a Comparison All GOPMSC chart that includes two complete sets of chart data element dates. A Comparison All GOPMSC is different from a Comparison Select GOPMSC in that it includes a comparison of chart data element dates for all of the project dates. Using this type of chart, one can clearly identify all of the slips relating to a work project.

Thus, although there have been described particular embodiments of the present invention of a new and useful System and Method for Updating Project Management Scheduling Charts, it is not intended that such references be construed as limitations upon the scope of this invention except as set forth in the following claims.

The invention claimed is:

1. A method of generating an updated version of a project management scheduling chart using a computer system, the chart containing a plurality of chart data elements to be updated, comprising the steps of;

selecting one of multiple source data elements in one or more data sources linked to each chart data element for use in generating the updated project management scheduling chart;

linking each chart data element to be undated to the multiple source data elements in the one or more data sources by assigning chart identification numbers to each chart data element to be updated and linking the chart identification numbers to the multiple source data elements in the one or more data sources, the step of assigning chart identification numbers to each chart data element to be updated including the steps of importing the chart data elements to be updated into a database and assigning chart identification numbers to each chart data element in the database, the step of linking the chart identification numbers to the multiple source data elements in the one or more data sources including the step of linking the chart identification numbers to unique identification numbers associated with the multiple source data elements in the one or more data sources;

the step of linking the chart identification numbers to unique identification numbers including the steps of creating maps linking the chart identification numbers to the unique identification numbers associated with the multiple source data elements in the one or more data sources, each map containing information identifying one of the linked multiple source data elements for use in generating the updated project management scheduling chart; and generating the updated version of the project management scheduling chart using the selected source data elements.

2. The method of claim 1, wherein the step of selecting one of the multiple source data elements linked to each chart data element for use in generating the updated project management scheduling chart includes the step of:

reading the maps linking the chart identification numbers to the unique identification numbers associated with the multiple source data elements in the one or more data sources to identify one of the multiple source data elements linked to each chart identification number for use in generating the updated project management scheduling chart.

3. A computer system for generating an updated version of a project management scheduling chart containing a plurality of chart data elements to be updated, comprising;

a first memory for storing the project management scheduling chart containing the plurality of chart data elements to be updated;

a second memory for storing information linking each of the chart data elements to multiple source data elements in one or more data sources and identifying one of the multiple source data elements for each chart data element for use in generating the updated version of the project management scheduling chart the information linking each of the chart data elements to multiple source data elements in one or more data sources including chart identification numbers associated with each chart data element to be updated and unique identification numbers associated with the multiple source data elements;

the one or more data sources containing the multiple source data elements linked to the chart data elements and including the unique identification numbers associated with the multiple source data elements;

an Update Module adapted to be used to select one of the multiple source data elements linked to each chart data element for use in generating the updated project management scheduling chart, to generate the updated version of the project management scheduling chart using the selected source data elements, to link each chart data element to be updated to the multiple source data elements in the one or more data sources, to assign the chart identification numbers to each chart data element to be updated and to link the chart identification numbers to the multiple source data elements in the one or more data sources, to import the chart data elements to be updated into the second memory and to assign chart identification numbers to each chart data element in the second memory, and to link the chart identification numbers to the unique identification numbers associated with the multiple source data elements; and wherein the information linking the chart data elements to multiple source data elements further includes maps linking the chart identification numbers to the unique identification numbers associated with the multiple source data elements in the one or more data sources, each map containing information identifying one of the linked multiple source data elements for use in generating the updated project management scheduling chart; and the Update Module is further adapted to be used to create the maps linking the chart identification numbers to the unique identification numbers associated with the multiple source data elements in the one or more data sources.

4. The computer system of claim 3, wherein the Updated Module is adapted to be used to read the maps linking the chart identification numbers to the unique identification numbers associated with the multiple source data elements in the one or more data sources to identify one of the multiple source data elements linked to each chart identification number for use in generating the updated project management scheduling chart.

5. A method of generating a comparison project management scheduling chart for a project management scheduling chart containing a plurality of original chart data elements using a computer system, comprising the steps of:

selecting one of multiple source data elements in one or more data sources linked to one or more chart data elements to be compared for use in generating the comparison project management scheduling chart;

linking the one or more chart data elements to be compared to multiple source data elements in the one or more data sources by assigning chart identification numbers to the one or more chart data elements to be compared and linking the chart identification numbers to the multiple source data elements in the one or more data sources;

the step of assigning chart identification numbers to the one or more chart data elements to be compared including the steps of importing the one or more chart data elements to be compared into a database and assigning chart identification numbers to the one or more chart data elements in the database;

the step of linking the chart identification numbers to the multiple source data elements in the one or more data sources including the step of linking the chart identification numbers to unique identification numbers associated with the multiple source data elements in the one or more data sources;

the step of linking the chart identification numbers to unique identification numbers associated with the multiple source data elements in the one or more data sources including the step of creating maps linking the chart identification numbers to the unique identification numbers associated with the multiple source data elements in the one or more data sources, each map containing information identifying one of the linked multiple source data elements for use in generating the comparison project management scheduling chart; and generating the comparison project management scheduling chart using the selected source data elements and the plurality of original chart data elements.

6. The method of claim 5, wherein the step of selecting one of the multiple source data elements linked to the one or more chart data elements to be compared for use in generating the comparison project management scheduling chart includes the step of:

reading the maps linking the chart identification numbers to the unique identification numbers associated with the multiple source data elements in the one or more data sources to identify one of the multiple source data elements linked to each chart identification number for use in generating the comparison project management scheduling chart.

7. A computer system for generating a comparison project management scheduling chart for a project management scheduling chart containing a plurality of criminal chart data elements, comprising:

a first memory for storing the project management scheduling chart containing the plurality of original chart data elements;

a second memory for storing information linking one or more of the original chart data elements to be compared to multiple source data elements in one or more data sources and identifying one of the multiple source data elements for each of the one or more original chart data elements to be compared for use in generating the comparison project management scheduling chart, the information linking the one or more original chart data elements to be compared to multiple source data elements in one or more data sources including chart identification numbers associated with each of the one or more original chart data elements to be compared and unique identification numbers associated with the multiple source data elements;

the one or more data sources containing the multiple source data elements linked to the one or more original chart data elements and including the unique identification numbers associated with the multiple source data elements;

an Update Module adapted to be used to select one of the multiple source data elements linked to each of the one or more original chart data elements to be compared for use in generating the comparison project management scheduling chart, to generate the comparison version of the project management scheduling chart using the selected source data elements and the plurality of original chart data elements, to link the one or more original chart data elements to be compared to the multiple source data elements in the one or more data sources, to assign the chart identification numbers to the one or more original chart data elements to be compared and to link the chart identification numbers to the multiple source data elements in the one or more data sources, to import the one or more original chart data elements to be compared into the second memory and to assign chart identification numbers to the one or more original chart data elements in the second memory, and to link the chart identification numbers to the unique identification numbers associated with the multiple source data elements; and wherein the information linking the one or more original chart data elements to be compared to multiple source data elements further includes maps linking the chart identification numbers to the unique identification numbers associated with the multiple source data elements in the one or more data sources, each map containing information identifying one of the linked multiple source data elements for use in generating the comparison project management scheduling chart; and the Update Module is further adapted to be used to create the maps linking the chart identification numbers to the unique identification numbers associated with the multiple source data elements in the one or more data sources.

8. The computer system of claim 7, wherein the Update Module is adapted to be used to read the maps linking the chart identification numbers to the unique identification numbers associated with the multiple source data elements in the one or more data sources to identify one of the multiple source data elements linked to each chart identification number for use in generating the comparison project management scheduling chart.

9. A method for generating an updated version of a project management scheduling chart using a computer system, comprising the steps of:

inputting into the computer system information identifying a project management scheduling chart to be updated, the chart containing a plurality of chart data elements to be updated;

inputting into the computer system information identifying one or more data sources containing multiple source data elements to be used to generate an updated version of the project management scheduling chart;

inputting into the computer system a request for the computer system to generate the updated version of the project management scheduling chart; and wherein the computer system performs the step of:

locating maps associated with the identified project management scheduling chart, each map containing information identifying multiple source data elements contained within the one or more data sources and linked to each of the chart data elements, each map further containing information identifying a type of source data element to be used when selecting one of the linked multiple source data elements for use in updating each chart data element;

reading the maps and identifying a type of source data element to be used to update each chart data element;

retrieving the identified type of source data element for each chart data element from the one or more data sources; and generating the updated version of the project management scheduling chart using the retrieved source data elements.

10. A computer system for generating an updated version of a project management scheduling chart, comprising:

an input means for inputting into the computer system information identifying a project management scheduling chart containing a plurality of chart data elements to be updated, information identifying one or more data sources containing multiple source data elements to be used to generate the updated version of the project management scheduling chart, and a request for the computer system to generate the updated version of the project management scheduling chart;

the one or more data sources containing multiple source data elements to be used to generate an updated version of the project management scheduling chart;

a memory for storing the identified project management scheduling chart containing the plurality of chart data elements to be updated and for storing maps associated with the identified project management scheduling chart, each map containing information identifying multiple source data elements contained within the one or more data sources and linked to each of the chart data elements, each map further containing information identifying a type of source data element to be used when selecting one of the linked multiple source data elements for use in updating each chart data element; and an Update Module for reading the maps and identifying a type of source data element to be used to update each chart data element, retrieving the identified type of source data element for each chart data element from the one or more data sources, and generating the updated version of the project management scheduling chart using the retrieved source data elements.

11. A method of generating and updating a project management scheduling chart using a computer system, comprising the steps of:

generating a project management scheduling chart by activating a GOPMSC Module for use in creating the project management scheduling chart and creating the project management scheduling chart using the GOPMSC Module, the project management scheduling chart including a plurality of chart data elements;

linking each chart data element to multiple source data elements in one or more data sources by importing each chart data element into a database in the computer system, assigning chart identification numbers to each chart data element, and creating maps in the database linking each chart identification number to the multiple source data elements in the one or more data sources, each map containing information identifying one of the multiple source data elements to be used in generating an updated version of the project management scheduling chart;

selecting one source data element for each chart data element for use in generating the updated version of the project management scheduling chart; and generating the updated version of the project management scheduling chart using the selected source data elements.

12. The method of claim 11, wherein the step of selecting one source data element for each chart data element includes the step of reading the maps containing information identifying one of the multiple source data elements to be used in generating the updated version of the project management scheduling chart.

13. The method of claim 12, further comprising the steps of:

linking one or more of the chart data elements to be compared to multiple new source data elements in one or more new data sources;

selecting one new source data element for each chart data element to be compared; and generating a comparison project management scheduling chart using the plurality of data elements and the one or more selected new source data elements.

14. The method of claim 13, wherein the step of linking one or more of the chart data elements to be compared includes the step of creating new maps linking each chart identification number associated with the one or more chart data elements to be compared to the multiple new source data elements in the one or more new data sources, each new map containing information identifying one of the multiple new source data elements to be used in generating the comparison project management scheduling chart.

15. The method of claim 14, wherein the step of selecting one new source data element for each chart data element to be compared includes the step of reading the new maps containing information identifying one of the multiple new source data elements to be used in generating the comparison project management scheduling chart.

16. A computer system for generating and updating project management scheduling charts, comprising:
- a GOPMSC Module for generating a project management scheduling chart, the project management scheduling chart including a plurality of chart data elements;
- an Update for activating the GOPMSC Module, linking each chart data element to multiple source data elements in one or more data sources, selecting one source data element for each chart data element for use in generating an updated version of the project management scheduling chart, and for generating the updated version of the project management scheduling chart using the selected source data elements;
- a memory for storing the project management scheduling chart and information linking each chart data element to the multiple source data elements in the one or more data sources and identifying one of the multiple source data elements for each chart data element for use in generating the updated version of the project management scheduling chart;
- the one or more data sources containing the multiple source data elements; and wherein the computer system further includes a database; and the Update Module is further operable to link each chart data element to multiple source data elements in one or more data sources by importing each chart data element into the database, assigning chart identification numbers to each chart data element, and creating maps in the database linking each chart identification number to the multiple source data elements in the one or more data sources, each map containing information identifying one of the multiple source data elements to be used in generating the updated version of the project management scheduling chart.

17. The computer system of claim 16, wherein the Update Module is operable to select one source data element for each chart data element by reading the maps containing information identifying one of the multiple source data elements to be used in generating the updated version of the project management scheduling chart.

18. The computer system of claim 17, wherein:
- the computer system includes one or more new data sources containing multiple new source data elements; and
- the Update Module is further operable to link one or more of chart data elements to be compared to the multiple new source data elements in one or more new data sources, select one new source data element for each chart data element to be compared, and generate a comparison project management scheduling chart using the plurality of selected source data elements and the one or more selected new source data elements.

19. The computer system of claim 18, wherein the Update Module is operable to link the one or more of the chart data elements to be compared by creating new maps linking each chart identification number associated with the one or more chart data elements to be compared to the multiple new source data elements in the one or more new data sources, each new map containing information identifying one of the multiple new source data elements to be used in generating the comparison the project management scheduling chart.

20. The computer system of claim 19, wherein the Update Module is operable to select one new source data element for each chart data element to be compared by reading the new maps containing information identifying one of the multiple new source data elements to be used in generating the comparison project management scheduling chart.

* * * * *